United States Patent
Hampel et al.

(10) Patent No.: US 10,084,495 B2
(45) Date of Patent: Sep. 25, 2018

(54) METHOD FOR FREQUENCY— AND TIME-SELECTIVE INTERFERENCE SUPPRESSION FOR A COMMUNICATION SYSTEM BASED ON OFDM, AND RECEIVER THEREFOR

(71) Applicant: iAd Gesellschaft für Informatik, Automatisierung und Datenverarbeitung mbH, Großhabersdorf (DE)

(72) Inventors: Hermann Hampel, Großhabersdorf (DE); Ulrich Berold, Nürnberg (DE); Martin Hirschbeck, Nürnberg (DE)

(73) Assignee: IAD GESELLSCHAFT FÜR INFORMATIK, AUTOMATISIERUNG UND DATENVERARBEITUNG MBH, Grosshabersdorf (DE)

( * ) Notice: Subject to any disclaimer, the term of this patent is extended or adjusted under 35 U.S.C. 154(b) by 0 days.

(21) Appl. No.: 15/546,231

(22) PCT Filed: Jan. 30, 2016

(86) PCT No.: PCT/EP2016/025004
§ 371 (c)(1),
(2) Date: Jul. 25, 2017

(87) PCT Pub. No.: WO2016/120020
PCT Pub. Date: Aug. 4, 2016

(65) Prior Publication Data
US 2018/0019774 A1    Jan. 18, 2018

(30) Foreign Application Priority Data
Feb. 1, 2015 (DE) .................. 10 2015 001 106

(51) Int. Cl.
  *H04B 1/10* (2006.01)
  *H04L 25/03* (2006.01)
  (Continued)

(52) U.S. Cl.
  CPC ............ *H04B 1/10* (2013.01); *H04J 11/0023* (2013.01); *H04L 25/0204* (2013.01);
  (Continued)

(58) Field of Classification Search
  CPC ............ H04L 1/0618; H04L 25/03159; H04L 27/2647
  See application file for complete search history.

(56) References Cited

U.S. PATENT DOCUMENTS

2010/0008454 A1* 1/2010 Schnell ............... H04L 25/022
                                                       375/346
2017/0126460 A1* 5/2017 Dutronc ............. H04L 27/2639

FOREIGN PATENT DOCUMENTS

DE          102010056087 A1    6/2012

OTHER PUBLICATIONS

Zhang, Q. et al., "Excision of Distance Measuring Equipment Interference From Radio Astronomy Signals", The Astronomical Journal, Jun. 2005, pp. 2933-2939, vol. 129, The American Astronomical Society, U.S.A.
(Continued)

*Primary Examiner* — Ross E Varndell
(74) *Attorney, Agent, or Firm* — Rankin, Hill & Clark LLP

(57) ABSTRACT

A method for frequency- and time-selective interference suppression for a communication system based on OFDM, and a receiver therefor. To achieve a much lower bit error rate at the output of the receiver or to permit greater interference or a lower signal-to-noise ratio (in a prior art L-DACS1 receiver, at least 45 nautical miles) for the same
(Continued)

Figure 1:
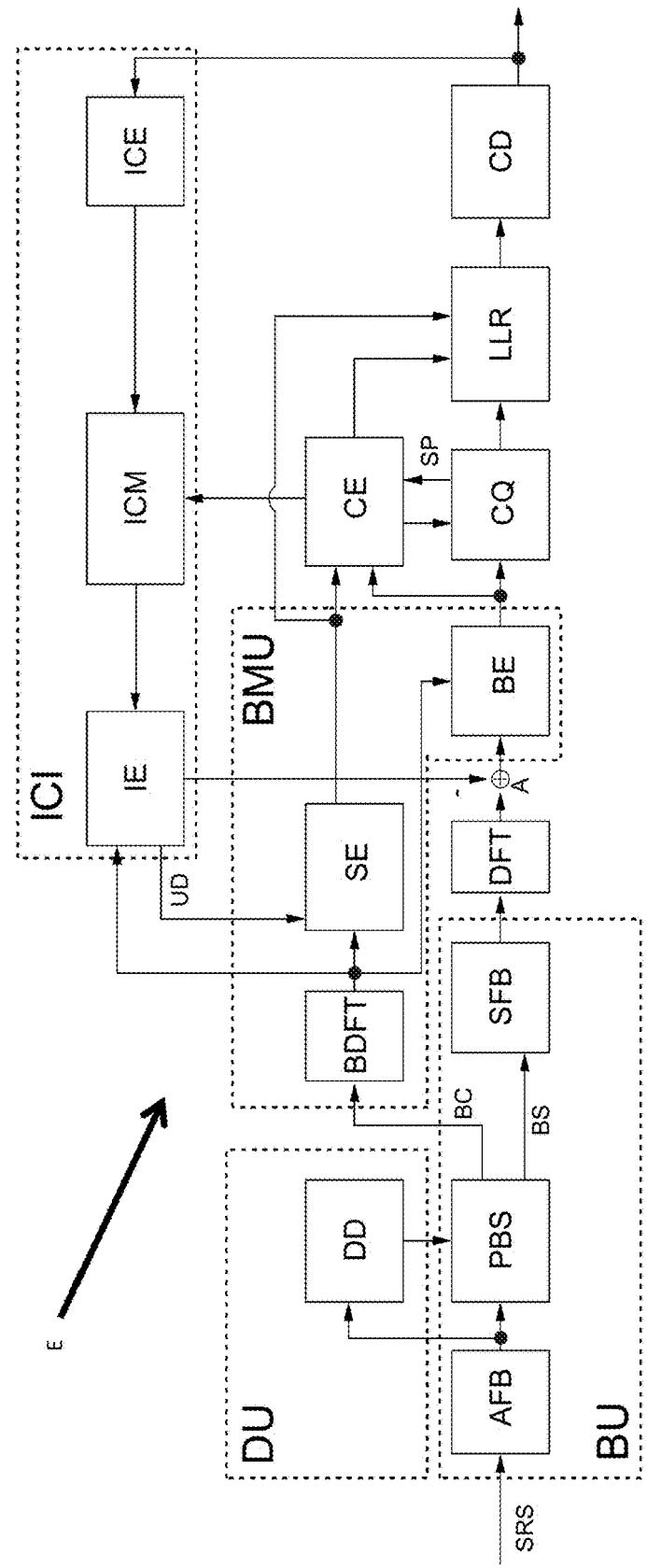

transmission power, the invention provides: a filter bank pulse blanking method FBPB in which the sampled received signal is applied to a blanking unit for frequency-selective pulse blanking, which blanking unit consists of an analysis filter bank having M sub-bands; a module for frequency-selective pulse blanking of the sub-band signals; and a synthesis filter bank, which reassembles the signal. The analysis filter bank, which breaks down the received signal into multiple sub-bands on a frequency-selective basis, is used before OFDM windowing, such that the sub-band breakdown applies pulse blanking on a sub-band-selective basis.

7 Claims, 10 Drawing Sheets
(9 of 10 Drawing Sheet(s) Filed in Color)

(51) Int. Cl.
*H04L 27/26* (2006.01)
*H04L 27/38* (2006.01)
*H04L 25/02* (2006.01)
*H04J 11/00* (2006.01)

(52) U.S. Cl.
CPC .. *H04L 25/03012* (2013.01); *H04L 25/03847* (2013.01); *H04L 27/2649* (2013.01); *H04L 27/38* (2013.01)

(56) References Cited

OTHER PUBLICATIONS

Wang, W. et al., A New Narrowband Interference Mitigation Algorithm Based on Adaptive Wavelet Packet Decomposition, 2014 Fouth International Conference on Instrumentation and Measurement, Computer, Communication and Control, Sep. 2014, pp. 6-11, Institute of Electrical and Electronics Engineers, U.S.A.

Schnell, M. et al., "Interference Mitigation for Broadband L-DACS", 2008 27th Digital Avionics Systems Conference, Oct. 2008, pp. 2.B.2-1-213.2-12, Institute of Electrical and Electronics Engineers, U.S.A.

* cited by examiner

Stations

METHOD FOR FREQUENCY—AND TIME-SELECTIVE INTERFERENCE SUPPRESSION FOR A COMMUNICATION SYSTEM BASED ON OFDM, AND RECEIVER THEREFOR

BACKGROUND OF THE INVENTION

1. Field of Invention

The invention relates to a method for the frequency-selective and time-selective interference suppression for a communication system based on OFDM. The invention also relates to a receiver for this purpose.

2. Brief Description of the Related Art

Air traffic is growing rapidly all over the world, coupled with increased demand for air traffic. Communication between Air traffic control and aircraft pilots is currently being AM-based communication systems in the VHF band. Unfortunately, the capacity of this system is limited so that other solutions are discussed to solve this problem in the future. L-band Digital Aeronautical Communication System 1 (L-DACS1) is a candidate for this task. It is intended to operate in the radio range of the L band (960-1164 MHz) and is based on orthogonal frequency division multiplexing (OFDM). It should be there used as an intermediate system between two Distance Measuring Equipment (DME) channels. Since the L-band is used by other radio systems, L-DACS 1 is designed as an intermediate system between frequency bands which are reserved for the pulse-shaped distance measuring equipment (DME). Of course, both systems interfere with each other, so that measures must be taken to deal with the interference of DME, these are impulsive Gaussian pulses, which are only 0.5 MHz, 1.5 MHz, etc., distanced from the LDACS1 center frequency in the frequency spectrum and which are used to determine the positions of aircraft. The L-DACS1 system according to the prior art is described below. As for example published by M. Sajatovic, B. Haindl, U. Epple, T. Gräupl in the publication "Updated LDACS1 System Specification", Doc. EWA04-1-T2-D1, 2011, the L-DACS1 system has a forward link (FL) and a reverse link (RL). FL corresponds to the connection from the ground station (GS) to the aircraft (AS), and for RL exactly the opposite. The DME ground stations with adjacent DME frequency channels must be at least 45 nm (nautical mile) apart, the nearest frequency channel at 2 MHz distance must be at least 10 nm apart. Every link uses a total bandwidth of approximately 500 kHz, which is divided into 50 subcarriers with a subcarrier spacing of 9.8 kHz. The length of an OFDM symbol is 120 µs; the usable portion is 102.4 µs.

Figure 2:
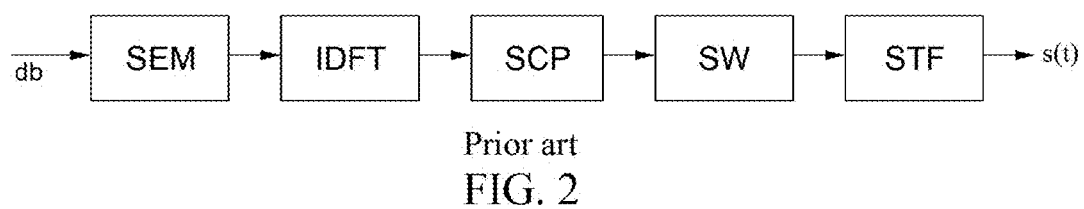

FIG. 2 shows the block circuit diagram of the transmitter (physical layer, Bit transfer layer) in the prior art. The binary symbols db supplied from a data source are encoded in a module SEM with Reed-Solomon and convolution coding and the modulation is QPSK, 16QAM or 64QAM, resulting in a total rate of 0.9-4.08 bit/QAM symbol. The modulated symbols, the synchronization and pilot symbols are mapped onto an OFDM frame structure. The sending symbols of a frame are denoted by $S_{l,k}$, where l and k are the time index of an OFDM symbol and the subcarrier index. Seven zero carriers are on the low frequencies (k={−32, . . . , −26}) and six zero carriers are on the high frequencies (k={26, . . . , −31}). Another zero carrier is located on the carrier frequency, i.e. on the equilibrium in the equivalent complex baseband ECB. An inverse discrete Fourier transform IDFT (see module IDFT) of size 64 is used to transform the subcarrier values of the lth OFDM symbol into the time domain. The time-discrete ECB signal is then:

$$s_l[n] = \frac{1}{\sqrt{64}} \sum_{k=-32}^{31} S_{l,k} \cdot e^{j2\pi \frac{k \cdot n}{64}}, \quad (1)$$

where n is the sampling time with n∈{0, . . . , 63}. A Cyclic Prefix (see module SCP) is added to convert the linear convolution into a cyclic one, as described in K. Kammayer, Nachrichtenübertragung, 4th edition, Wiesbaden, Germany: Vieweg+Teubner, 2011. In order to reduce the interference to adjacent systems in the frequency domain, each OFDM symbol is windowed with a Raised Cosine window in the time domain (see module SW). Finally, a transmission filter (see module STF) forms the time-continuous transmission signal s (t).

Figure 3:
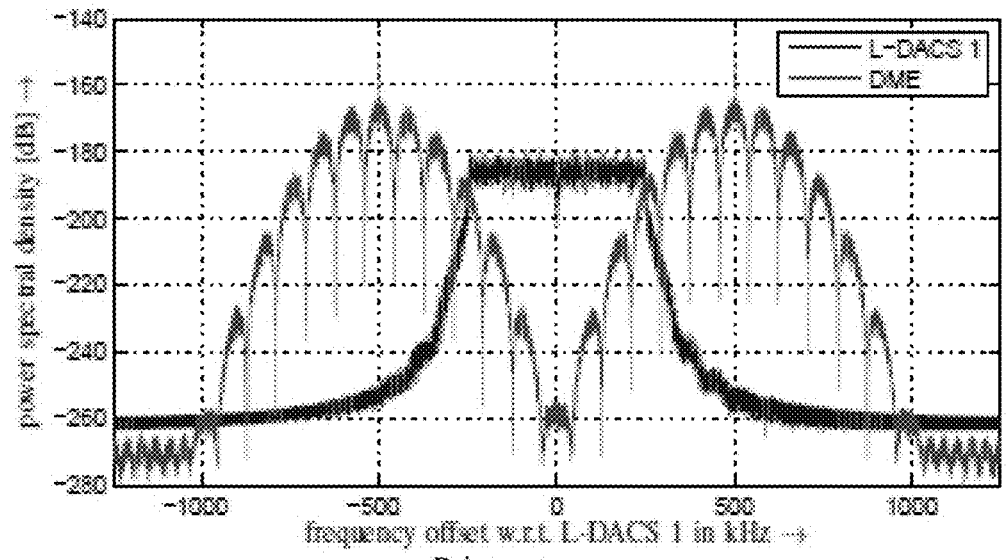
Figure 4:
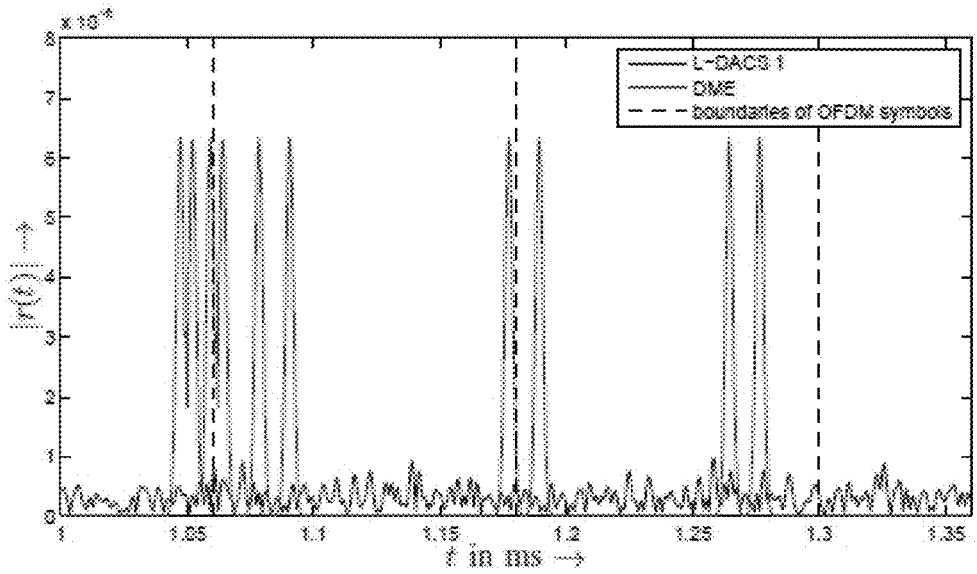

The L-DACS1 FL/RL channel frequencies range from 985.5 MHz to 1008.5 MHz, and from 1048.5 MHz to 1071.5 MHz. The channel spacing is 1 MHz. The DME channels are distributed between two L-DACS1 channels. In FIG. 3 and FIG. 4, the simultaneous reception of DME and L-DACS1 signals is shown by way of example in the frequency and time domain in the prior art. The spectral power of DME drops very rapidly with increasing frequency spacing. Therefore, it is to be assumed that only two DME channels with carrier frequencies ±0.5 MHz remains after the reception filter (see FIG. 5, low-pass filter LF). The DME system is used to determine the positions of aircrafts and also consists of ground and flight station. Ground station and flight station operate as interrogation unit (interrogator) and transponder. A DME ground station transmits with a fixed peak transmission power and a fixed duty cycle. The peak transmission power is 30 dBW at a DME ground station; in detail, see U. Epple, M. Schnell, "Overview of interference situation and mitigation Techniques for LDACS1," Digital Avionics Systems Conference (DASC), pp. 4C5-1-4C5-12, 2011 or S. Brandes, S. Gligorevic, M. Ehammer, T. Gräupl, R. Dittrich, "Expected B-AMC System Performance", Doc ref. CIEA15EN506.11, 2007 or M. Sajatovic, B. Haindl, U. Epple, T. Gräupl, "Updated LDACS1 System Specification", reference as above. The duty cycle of a ground station is 2700 pulse-pairs per second (ppps) of a regular DME station and 3600 ppps of a Tactical Air Navigation (TACAN) station. The DME and TACAN planes send with a peak transmission power of 33 dBW and 34.8 dBW. The highest possible TACAN pulse amplitude is assumed below. The duty cycle for the excitation is 150 ppps in the search mode and 30 ppps in the tracking mode. The DME time signal is defined as two Gaussian pulses in the equivalent complex baseband (ECB):

$$i^{DME}(t) = \left(e^{-\pi\left(\frac{t-t_0}{\Delta t}\right)^2} + e^{-\pi\left(\frac{t-t_0-\Delta \tau}{\Delta t}\right)^2}\right) e^{j2\pi(\pm 0.5 MHz)t} \quad (2)$$

where Δt=3,7367 µs and Δτ=12 µs are the DME (mode X) system parameters. The time offset $t_0$ relative to the OFDM frame is unknown at the L-DACS 1-receiver. The carrier frequencies of L-DACS 1 and the worst interfering DME channels have a frequency spacing of ±0.5 MHz.

At the L-DACS 1-receiver EST (see FIG. 5) according to the prior art, an aerial channel en-route as a channel model is assumed in which an aircraft flies towards the ground station at a speed of 1.111.3 km/h. This results in a Doppler frequency of +1.103 Hz at a carrier frequency of 1.072 MHz. Two echoes are additionally produced with delays of 0.3 µs and 15 µs and attenuations of 22 dB and 16 dB and Doppler shifts of +937.7 Hz and −662 Hz. This is a worst-case scenario with respect to Doppler broadening. If a radio channel is used, in which the aircraft flies at constant speed in the air, there is a strong component with direct visual connection. This can be modeled as a model with additive white Gaussian noise (AWGN) when perfect channel estimation and equalization is assumed. On the receiver side (input signal SRS), the sampled receive signal $r_l[n]$ of an OFDM-Symbol 1 after the OFDM windowing is:

$$r_l[n]=s_l[n]*h_l[n]+n_l^{AWGN}[n]+i_l^{DME}[n]. \quad (3)$$

with time index n, with $h_l[n]$ as the channel weight function, with $n_l^{AWGN}[n]$ as the additive white Gaussian noise (mean value and variance $\sigma_n^2$) and $i_l^{DME}[n]$ as the DME-interference signal of an OFDM-Symbol 1, i.e. for the filtered and sampled DME-signal. Thereafter, the DFT (see FIG. 5, in the DFT module) is applied to the sampled receive signal, and the output of discrete Fourier transformation (DFT) on the subcarrier index k and the OFDM-Symbol 1 is:

$$R_{l,k}=H_{l,k}\cdot S_{l,k}+N_{l,k}+I_{l,k}^{DME} \quad (4)$$

with $S_{l,k}$ for the DFT of the L-DACS1 signal, with $H_{l,k}$ for the channel, with $N_{l,k}$ for the noise, and with $I_{l,k}^{DME}$ for the DME-interference (interference). In order to eliminate the effects of an inaccurate channel estimation, a perfect synchronization to time and frequency offset and perfect channel equalization (FIG. 5, FIG. 6: module for channel equalization CQ) is used. Finally, the data is demodulated and decoded (see FIGS. 5, 6, in module DD and output signal DEC) to obtain an estimation of the transmitted bits.

Figure 5:
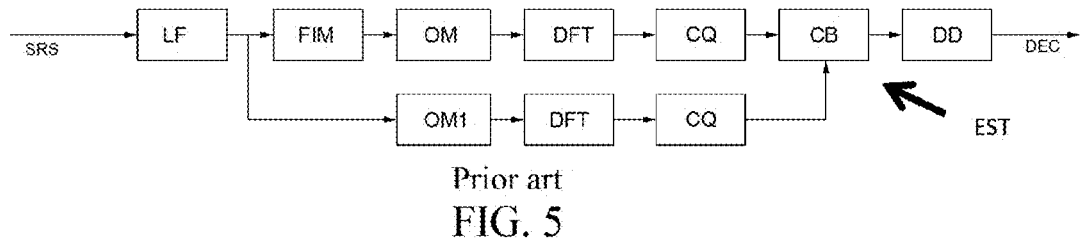
Figure 6:
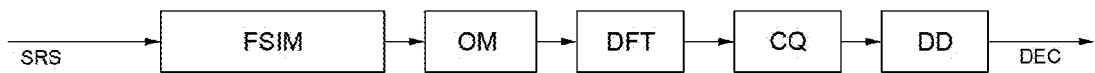

Various pulse blanking approaches are known for the suppression of pulse-shaped interferences, which can be used for the use of DME suppression in an L-DACS1-receiver. DME-suppression (FIG. 5 in module FIM, FIG. 6 in module FSIM) should be applied before the OFDM-windowing (FIG. 5, FIG. 6 in module OM). When a DME pulse is directly on the edge of the rectangular OFDM-window in the time domain, the spectral form of the DME-signal is lost and L-DACS1-frequencies are affected. Because of the frequency-selective character of DME, the suppression should be implemented frequency-selectively.

For example, from DE 10 2008 032 913 A1, a method for the compensation of information losses generated by suppressing pulse-shaped interferences in a receiver received by a receiver. This compensation method is used for communication signals in aviation, in the case of OFDM-based systems. The prior art includes techniques that attenuate pulse interference in communication or navigation systems. For this purpose, the techniques of pulse blanking and clipping or combinations of both techniques are used, see, for example, Sergey V. Zhidkov, "Analysis and Comparison of Several Simple Impulsive Noise Mitigation Schemes for OFDM Receivers," IEEE Transactions of Communications, vol. 56, no. 1, pp. 5-9, January 2008 or Grace Xingxin Gao, "DME/TACAN Interference and its Mitigation in L5/E5 Bands," in ION Institute of Navigation Global Navigation Satellite Systems Conference, 2007. Both the "pulse blanking" and the "clipping" significantly reduce the influence of the pulse-shaped interference, so that the performance of the OFDM system overall improves. However, not only the interference signal but also the desired OFDM-signal is influenced, which is associated with losses in the performance which significantly reduce the gain by "pulse blanking" or "clipping". In order to obtain the information losses generated by the suppression of pulse-shaped interference influences in a signal received by a receiver, the receiver receives a modulated OFDM-based signal with pulse-shaped interfering signals (interference pulses), which has a superposition of a sequence of a predetermined number of carrier frequency signals, whose frequencies differ by a constant amount from one another and which essentially have no signal components at frequencies of the other carrier frequency signals. The pulse-shaped interference signals are eliminated by pulse suppression, in that the interference pulses are first detected and then the modulated signal in the receiver is set to zero at the points affected by the pulse-shaped interference. The signal thus obtained, in frequency range, is characterized by the fact that the signal components at each carrier frequency are a superposition of determinable signal components of all other carrier frequency signals. From the respective signal component, at a carrier frequency, those signal components which can be determined are subtracted from the respective signal components of carrier frequency signals of all other carrier frequencies, and the information losses generated by the suppression of the pulse-shaped interference effects are compensated (and, if appropriate, the compensated signal is detected and decoded in the receiver). Since such a compensation is used in this method proposed in DE 10 2008 032 913 A1 (which is able to reverse the influence of "pulse blanking" in OFDM-based communication systems), special characteristic properties of OFDM-signals are utilized only in OFDM-based communication systems, and this method can only be used in OFDM-based communication systems.

In a method known as erasure decoding (see M. Schnell, S. Brandes, S. Gligorevic, German Aerospace Center (DLR), 82234 Wessling, Germany, M. Walter, "Interference Mitigation for Broadband L-DACS", 27th Digital Avionics Systems Conference (DASC) 2008), the power of the disturbance is first estimated on each subcarrier (i.e. after the signal has been converted into the frequency range using the discrete Fourier transform (DFT)). Subsequently, the data of the subcarriers at which a disturbance is assumed are classified as unreliable. For this purpose, the disturbance must be estimated in advance. The bit error rate decreases after decoding.

Accordingly, the Erasure Decoding method affects the reduction of the Interferences of pulse-shaped interfering signals in an OFDM-based Data transmission system, comprising the step of multiplying a frequency transmission signal comprising a multi-carrier frequency signal having individual ones carrier frequencies, with a window function for the suppression of a pulsed interference signal in the transmission signal. Here, the window function—as viewed in the time domain as a continuous function—can be differentiated and the one multiplied with the window function is decoded after a transmission channel estimation and signal equalization. In the transmission channel estimation of the data, associated with the individual carrier frequencies, is assigned a reliability value which describes how credible the received or estimated data are. Finally, the reliability value for those data which are associated with the carrier frequencies affected by a pulse-shaped interference signal is set to zero before decoding.

In a further development of the Erasure Decoding method, it is proposed in DE 10 2010 056 087 A1 that the window function is defined by a spectrum having a width $T_0$ in the time domain and a spectrum having a center frequency and spectral coefficients defined in the frequency domain by rectangle window function. This rectangular window function is realized either by filtering the spectrum by means of a filter with a bandwidth which is 8 times or 16 times of $1/T_0$. Alternatively, by reducing the spectrum to the K most significant spectral coefficients or to those K spectral coefficients whose associated frequencies are adjacent to the center frequency of the spectrum, whereby the parameter K being equal to 8 or 16. Thereby a widening of the interference signal in the frequency range and thus an increase in the number of symbols affected by the interference are avoided. In particular, the pulse-shaped interference signal in the transmission signal is blanked out by the multiplication of the transmission signal by the window function, while by the window function, the pulse-shaped interference signal is reduced to zero or to values not equal to zero. The multiplication takes place digitally, wherein the window function is in the form of discrete values at predetermined sampling instants and the useful signal is scanned and the useful signal samples are multiplied by the values at the temporally corresponding sampling instants of the window function. For the suppression of the pulse impulse, a rectangular window is not used, as is customary in the prior art, but a window shape which has more favorable spectral properties. In particular, the selection of the window shape is based on the fact that the disturbing power is as little as possible smeared in the frequency range. This is achieved with window shapes which either have a frequency-limited spectrum or whose spectrum decays rapidly. By using a window shapes with favorable spectral, as described above, the substantial influence of a pulse interferer on a part of the subcarriers is limited. An equalizer for the reduction of the interference introduced by pulse suppression into the received useful signal has a lower complexity, since for the equalization the equalizer had only to consider less disturbed subcarriers. In contrast, an equalizer for reducing the interference caused by pulse blanking according to the prior art (rectangle windows) would have to take into account all subcarriers. In addition, soft pulse suppression is used instead of the rectangular pulse development in order to prevent smearing of the interfering power of the pulse interferer over the entire useful signal bandwidth. The influence of the pulse interferer thus remains limited to a part of the subcarriers. In the case of pulse blanking according to the prior art (rectangular window), all subcarriers of the useful signal are disturbed. This results in a significant reduction in the signal-to-noise ratio on all subcarriers, which have a negative effect to the decoding performance. On the other hand, in the method set forth in DE 10 2010 056 087 A1, the disturbance introduced by pulse suppression remains limited to a part of the subcarriers. The remaining subcarriers have a virtually unchanged signal-to-noise ratio. Thus, this method can advantageously be combined with "Erasure" decoding. The limitation of the interfering power to a part of the subcarriers allows the modulation symbols of the interfered subcarriers to be declared as "Erasures" and then to perform an "Erasure" decoding. The combination of soft pulse blanking PB and "Erasure" decoding results in a much better system performance than rectangular pulse suppression.

In M. Schnell, S. Brandes, S. Gligorevic, German Aerospace Center (DLR), 82234 Wessling, Germany, M. Walter, "Interference Mitigation for Broadband L-DACS", reference as above, pulse blanking in an OFDM system is described using power detection. In this case, sample values are set to zero, the reception level of which exceeds a certain threshold value. This results in undesirable inter-carrier interferences (ICI), i.e. a crosstalk of subcarriers.

In order to adapt an OFDM-system to blanking nonlinearities in U. Epple, K. Shibli, M. Schnell, "Investigation of Blanking Nonlinearity in OFDM Systems", International Conference on Communications (ICC), 2011 is analyzed, the impact of pulse blanking in the OFDM-system to the useful signal and to the signal-to-noise ratios on each subcarrier. Similarly, it was assumed that the positions at which the receive signal is set to zero (i.e., blanked) are randomly distributed. However, this is not the case for DME and L-DACS, since a DME-pulse continues over several L-DACS samples. The influence of blanking on the useful signal is compensated by this method. In addition, the influence on the signal-to-interference ratios for channel estimation and decoding is estimated and exploited there.

In S. Brandes, U. Epple, M. Schnell, "Compensation of the Impact of Interference Mitigation by Pulse Blanking on OFDM Systems", Global Telecommunications Conference (GLOBECOM), pp. 1-6, 2009, a pulse-blanking approach with power detection in the time domain is presented, how this ICI can be calculated with an iterative structure and can be subtracted from the signal in order to suppress DME in an L-DACS 1 receiver. This method is hereinafter referred to as Simple Pulse Blanking SPB. The upper path of FIG. 5 without the combining block CB corresponds to the block switching pattern of SPB. In this method, the average reception power after the low-pass filtering $P_{rec}$ is measured and the time points at which the instantaneous power of the complex envelope of the received signal exceeds the threshold value $\theta \cdot P_{rec}$ is detected. There $\theta$ is a parameter to be optimized. The sampled discrete receive signal is set to zero at this time points:

$$r^{PB}[n] = \begin{cases} r[n], & \text{if } |r[n]|^2 < \theta \cdot \bar{P}_{rec} \\ 0, & \text{else} \end{cases} \quad (5)$$

This blanking (FIG. 5, in module FIM) leads to inter-subcarrier interferences (ICI) since the orthogonality of the subcarriers is lost. After the estimation at the receiving side of the transmitted QAM-Symbole $S_{l,k}$ the ICI values $I_{l,k}^{ICI}$ can be calculated iteratively and subtracted from the blanked signal, see S. Brandes, U. Epple, M. Schnell, "Compensation of the Impact of Interference Mitigation by Pulse Blanking on OFDM Systems", reference as above.

The determining parameter of this technique is the threshold value $\theta$. If a high value is selected, the ICI is low, but the power of the non-suppressed DME disturber remains high. Conversely, when a low value is selected, most DME is blanked, but ICI becomes larger. If a successive ICI erasure is applied, the threshold can be decreased because the additional ICI is reduced there. A low-pass filter LF (see FIG. 5) is necessary to filter out the DME-signals with low reception power. If the filter LF is missing, the blanking process leads to additional, avoidable ICI.

A proposal utilizing the frequency selectivity of DME is described in U. Epple, D. Shutin, M. Schnell, "Mitigation of Impulsive Frequency-Selective Interference in OFDM Based Systems", IEEE Wireless Communications Letters, pp. 484-487, 2012. Pulse blanking is thereby expanded by combining the signal processed with pulse blanking after the discrete Fourier transform (DFT) with a signal which has not been processed by pulse blanking, i.e. the lower path is added, see FIG. 5. There the step of blanking is omitted. Subcarriers that are not affected by DME interference benefit from this additional path.

After the OFDM demodulation, the subcarrier values of both paths are combined (see FIG. 5, module CB). For this purpose, the signal-to-noise ratios of both paths must be known. However, many DME pulses in the additional path are truncated by the OFDM-windowing (see FIG. 5, in the module OM1) and therefore are spectrally spread. Thus, the upper pathway suffers from ICI and residual DME-disturbance, the lower path suffers only from severe DME-disturbance. If a subcarrier is not in the frequency range of DME, the lower path is advantageous. The outputs of both paths are combined according to the DFT in the combination-block CB. In order to do this, the DME interference must be detected very precisely as the combination-block CB must know the signal-to-noise and noise (SINR) ratios of all subcarriers on both paths. Unfortunately, the loss through suboptimal combination can be very high. The approach is hereinafter referred to as Combination Pulse Blanking CPB. The low-pass filter LF is also necessary here because of the same reasons as for SPB. In addition, a low-pass filter prevents a spectral spreading of DME signals (cf. FIG. 9) obtained by OFDM-windowing in the lower path of FIG. 5.

Figure 8:
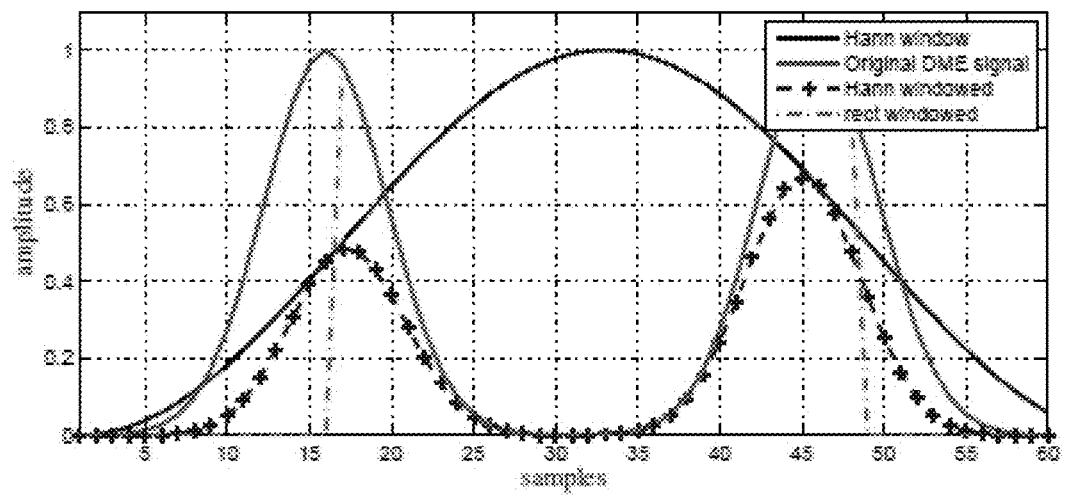
Figure 9:
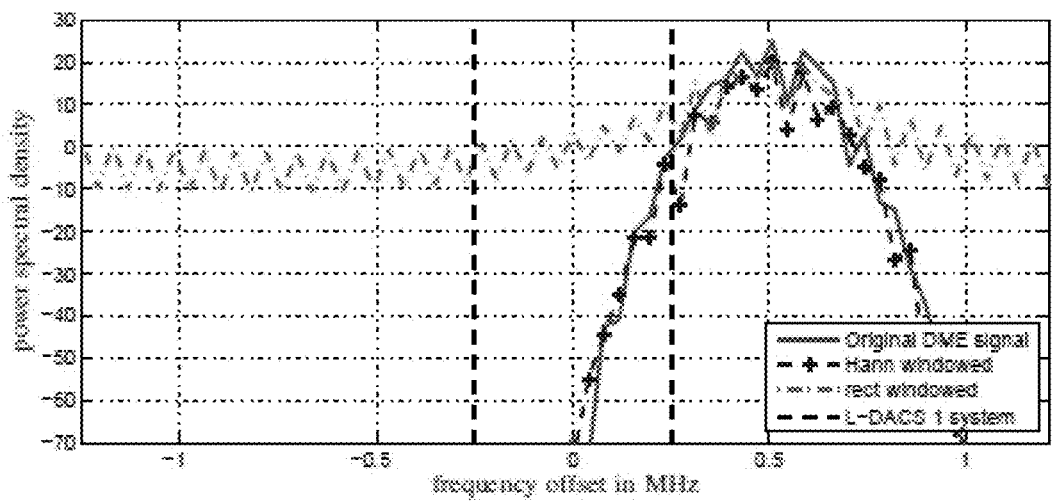

The problem of Combination Pulse Blanking CPB is the order of the processing blocks: An OFDM-windowing in the module OM (see FIG. 6) is before the DME-suppression. This leads to time-variant disturbances in the unblanked path. If a DME-pulse is directly on the flanks of the window-shaped OFDM window, the spectral form of the DME signals are destroyed and L-DACS1 frequencies are taken (as can be seen in FIGS. 8 and 9).

Furthermore, from US 2014/0376667 A1, a method and a multi-carrier system, in particular a power line communication (PLC) system such as, for example, the PLC systems (G3-PLC) transmitting according to the G3-PLC standard, for reducing the interferences of pulse-shaped interference signals in an OFDM (Orthogonal Frequency Division Multiplexing) data transfer is known. After frame detection and synchronization, the OFDM-symbols, i.e. the carrier frequency signal received in the receiver are demodulated and further processed with the individual carrier frequencies, and superimposed pulse-shaped interference signals, in order to obtain the transmitted data. To correct data errors, typical receiver implementations occur error correction mechanisms, such as interleaving and forward error correction (FEC) with convolution coding. However, error correction mechanisms can be less effective in the effects of channel noise if the individual carrier frequencies (subcarriers) are significantly interfered. According to the method of US 2014/0376667 A1, the pulse-shaped interference signals in the modulated OFDM-based signal are detected in the receiver. In order to suppress a pulse-shaped interference signal in the reception signal, a narrow band pulse suppression based on exceeding a predefined energy threshold is used. Furthermore, the transmission signal multiplied by the window-function is decoded after a transmission channel estimation and signal equalization. The transmission channel estimation is performed for example by analyzing the energy level for each individual carrier frequency (subcarrier) within the communication channel on receipt of known signals, such as a preamble, pilots and/or other signals with a known assigned energy level. Furthermore, those data which are associated with the carrier frequencies affected by a pulse-shaped interference signal are set to zero prior to decoding in the receiver. Subsequently, the scanned receiving signal is supplied to a blanking unit for frequency-selective pulse-blanking, which consists of an analysis filter bank with M sub-bands and a module for the frequency-selective pulse-blanking of the sub-band signals.

Finally, M. B. Celebi; I. Guvenc; H. Arslan, "Interference Mitigation for LTE Uplink Through Iterative Blanking," published in: IEEE Global Telecommunications Conference, 2011, pp. 1-6, discloses a filter bank pulse-blanking method, in which the analysis filter bank prior to a OFDM window is used in such a way that pulse-blanking is applied sub-band-selectively.

BRIEF SUMMARY OF THE INVENTION

It is an object of the invention contrary to the pulse-blanking with combination unit after the OFDM demodulation to avoid that the impulse noise is deformed during the OFDM-windowing.

This object is achieved, by a method that provides a filter bank pulse-blanking method FBPB, in which
a sampled reception signal from a blanking unit is supplied to a frequency-selective pulse-blanking, which is composed of an analysis filter bank with M sub-bands, a module for frequency-selective pulse-blanking of the sub-band signals and a synthesis filter bank, which recombines the signal, and
the analysis filter bank, which converts frequency-selectively the received signal into several sub-bands before an OFDM-windowing is used in such a way that by sub-band decomposition pulse-blanking is applied sub-band-selectively.

Furthermore, this object is solved in that a block-based frequency interference mitigation method BBFIM is used whereby an FFT of length M is applied to the blocks of length M in the time domain, the DME interference is then suppressed in the frequency domain, and finally the time signal is retrieved by an IFFT, whereby a Hann windowing or another Nyquist window with soft edge is used and the interference suppression in the frequency domain is carried out by means of a complexity-reduced block structure such that a spectral analysis is combined with the interference suppression and time-variant filtering takes place in the frequency range.

Finally, this object is achieved by a receiver in that the sampled reception signal is supplied to a blanking unit for frequency-selective pulse-blanking, which comprises an analysis filter bank with M sub-bands, a module for frequency-selective pulse-blanking of the sub-band signals and a synthesis filter bank, which recomposes the signal, and that for the detection of a disturbance in the sub-bands the blanking unit is connected to a detection unit and for adapting to interfered disturbances by pulse-blanking the blanking unit is connected to a blanking mitigation unit.

Compared to the prior art, the filter bank implementation FBPB according to the first embodiment has a higher complexity than the methods known from the prior art. The more efficient block-based structure/method BBFIM according to the second embodiment has a complexity comparable to the prior art.

In order to overcome the disadvantages of the method described by U. Epple, D. Shutin, M. Schnell, Mitigation of Impulsive Frequency-Selective Interference in OFDM Based Systems", reference as above, by the method according to the invention, the interference suppression is occurred before the OFDM demodulation, and both the OFDM demodulation, as well as the channel decoding are adjusted. This prevents the impulse disturbance from being deformed during the OFDM-windowing. The choice of number and type of filter can be adapted to the frequency band widths of the useful and interference signal. Due to the sub-band decomposition in the filter bank implementation FBPB using the analysis filter bank AFB in the blanking unit BU, pulse blanking can now be used directly sub-band-selective, i.e. frequency selective. As a result, the useful signal is only changed where interference is also present. In addition, the estimation of the interference power in the time and frequency domain is facilitated, since the reception signal is present in many sub-bands with the aid of the filter bank. As a result, ICI is greatly reduced by this method. The remaining disturbance is estimated by using the blanking mitigation unit BMU and forwarded to the other components of the OFDM receiver. All these measures result in a significantly lower bit error rate at the output of the receiver or at the same transmission power, stronger disturbances or a smaller signal-to-noise ratio (in the prior art at least 45 nm (nautical mile)) can be permitted.

The efficient block-based inference suppression method BBFIM loses through block processing precision, i.e. the useful signal is changed more strongly than in the filter-bank approach. This results in a higher bit error rate, but this is still lower than in the prior art. The lack of adaptation of the OFDM receiver components leads to the fact that, especially in the case of higher modulation stages, e.g. 64-QAM, the gap to the filter bank method becomes larger.

BRIEF DESCRIPTION OF THE DRAWING FIGURES

The patent or application file contains at least one drawing executed in color. Copies of this patent or patent application publication with color drawing(s) will be provided by the Office upon request and payment of the necessary fee.

Figure 7:
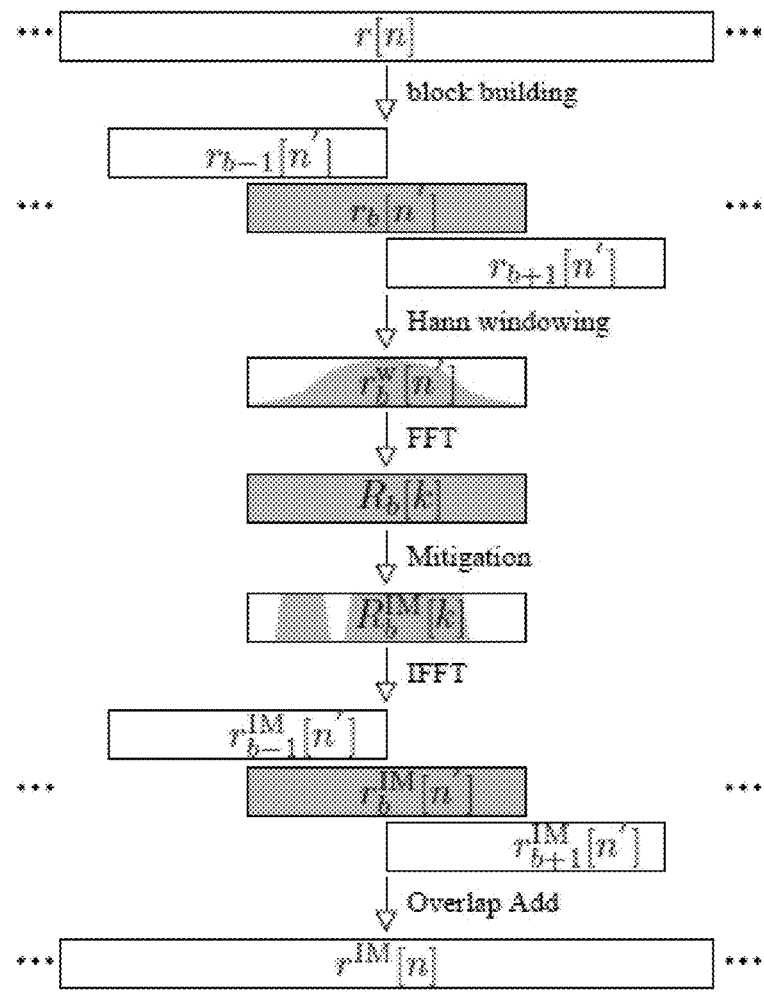
Figure 10:
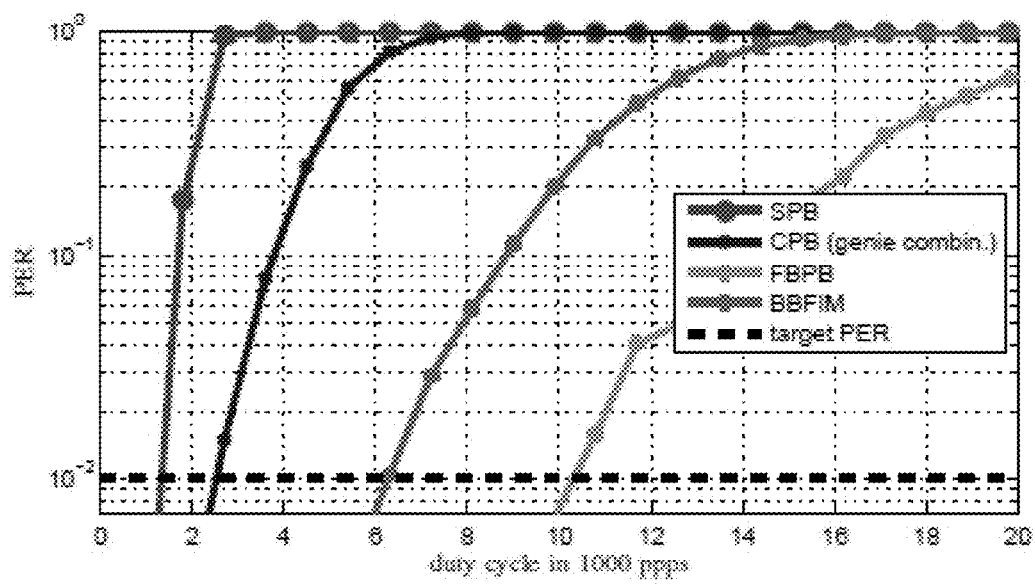
Figure 11:
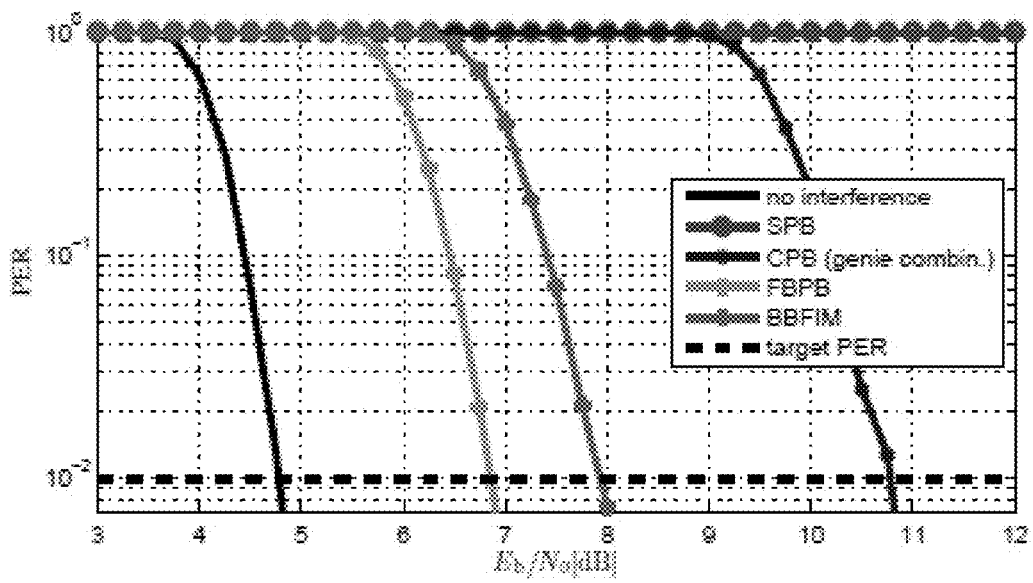
Figure 12:
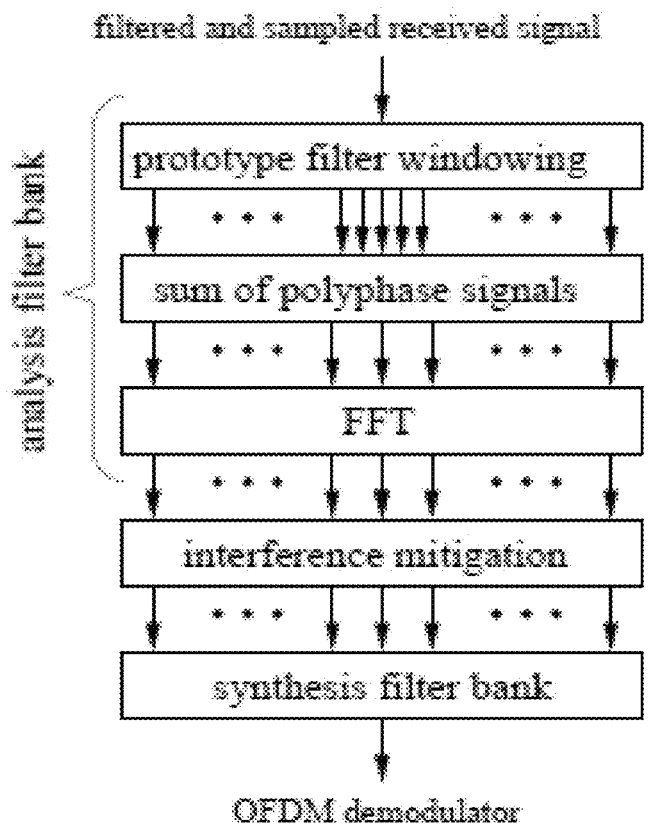
Figure 13:
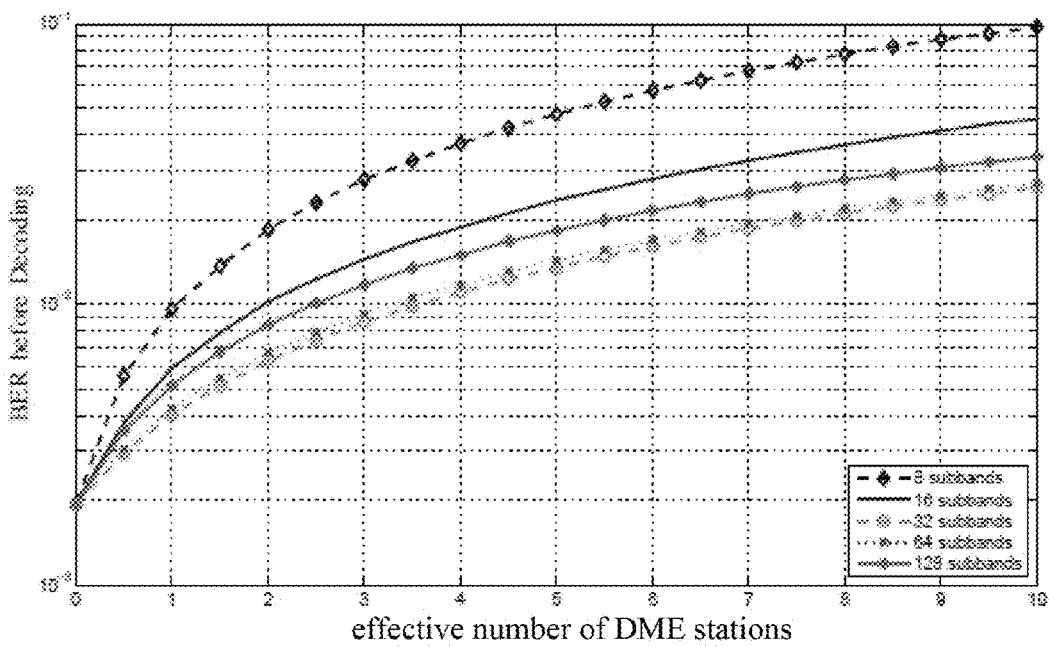
Figure 14:
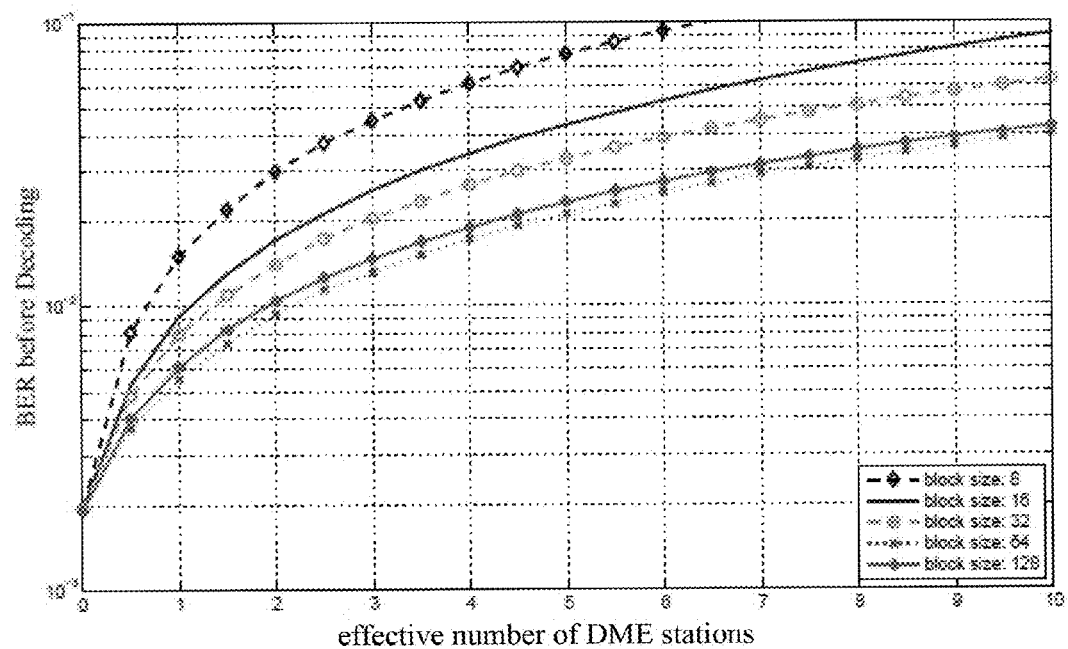
Figure 15:
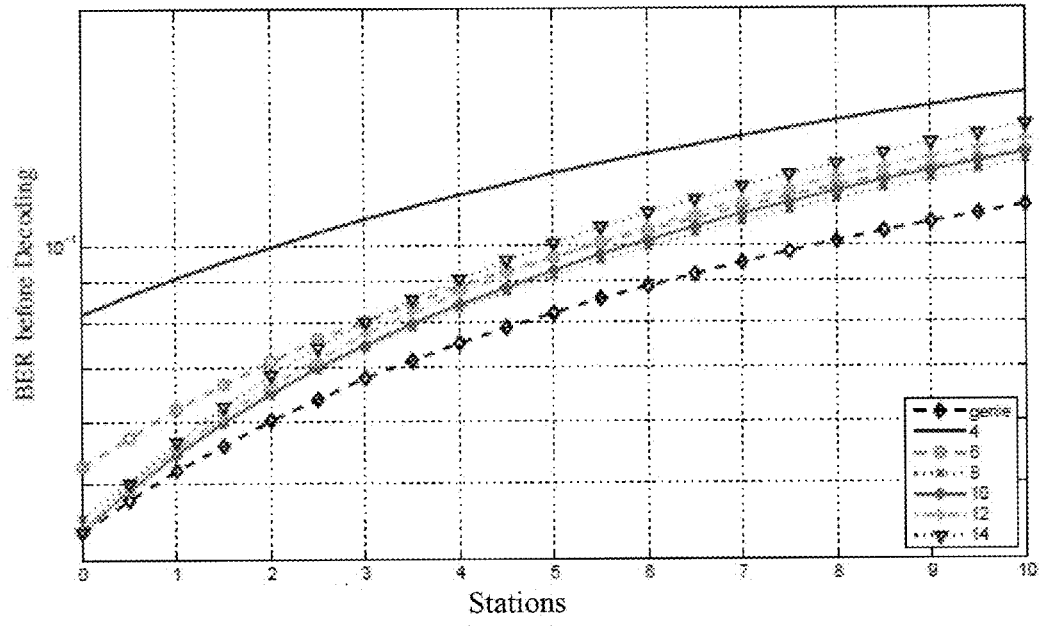
Figure 16:
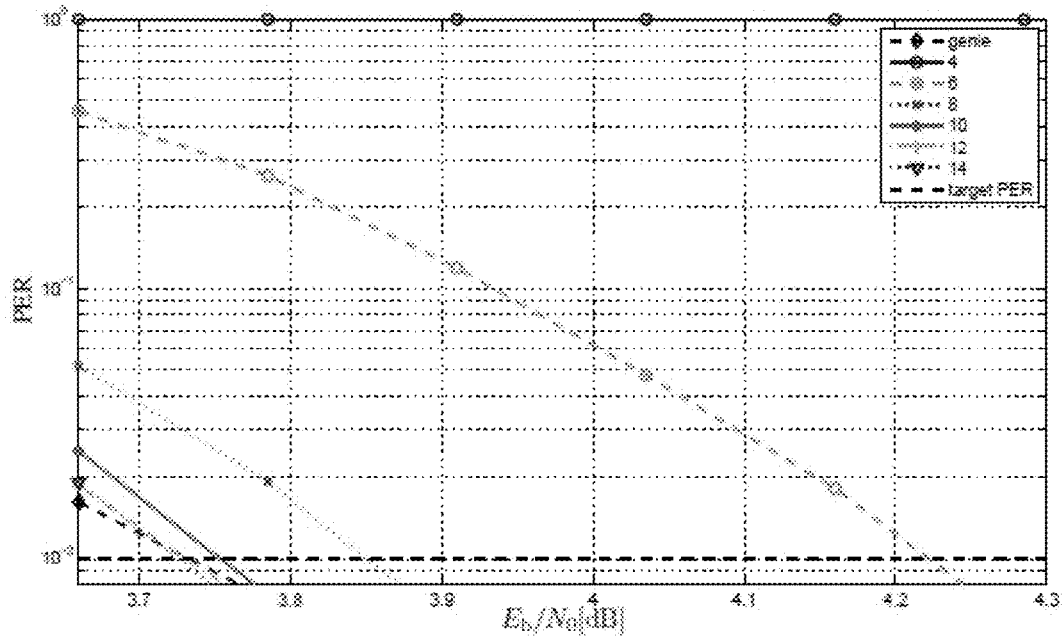
Figure 17:
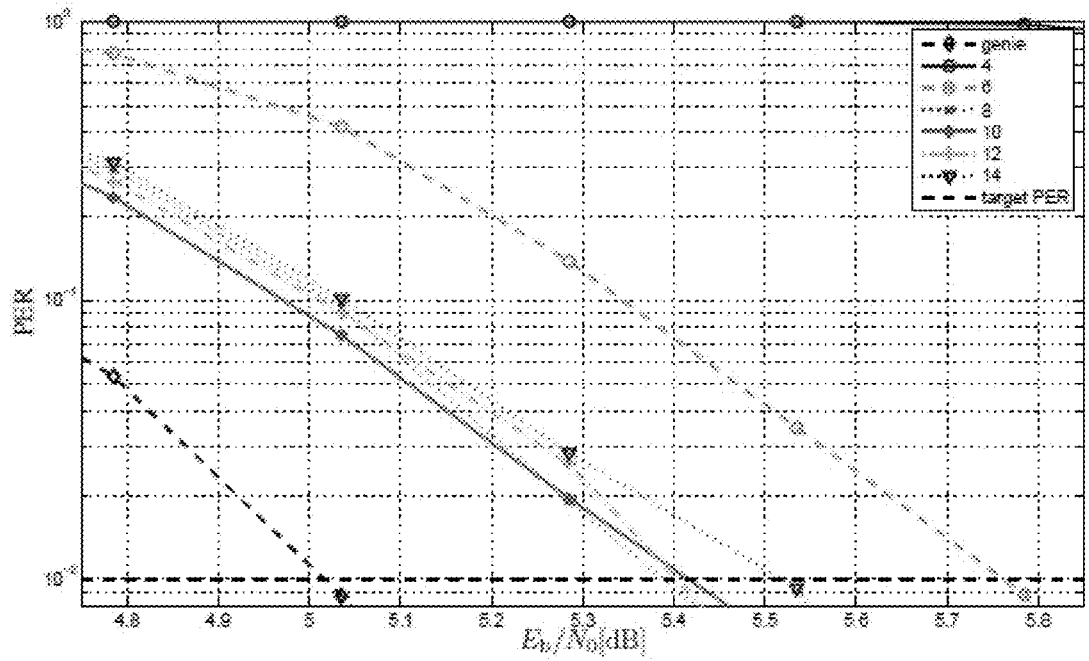
Figure 18:
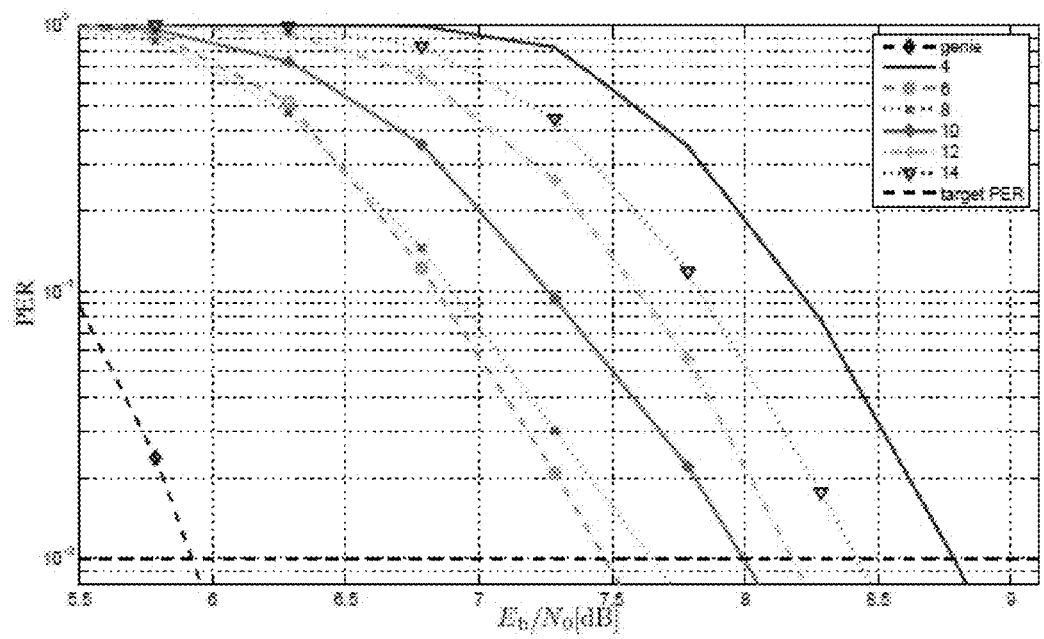
Figure 19:
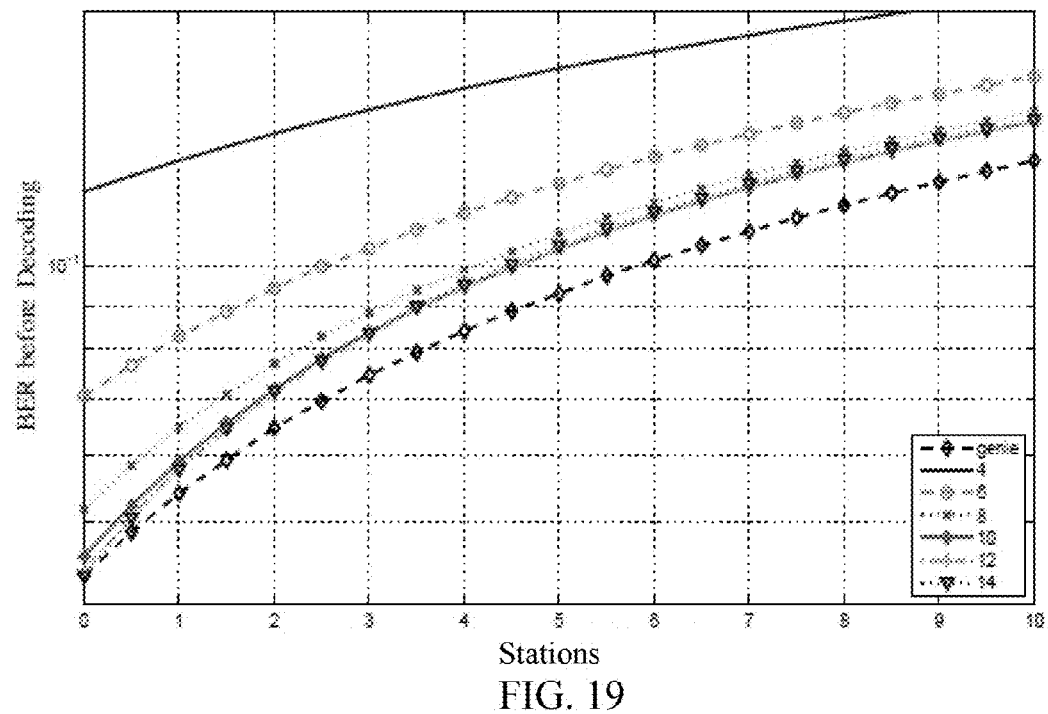
Figure 20:
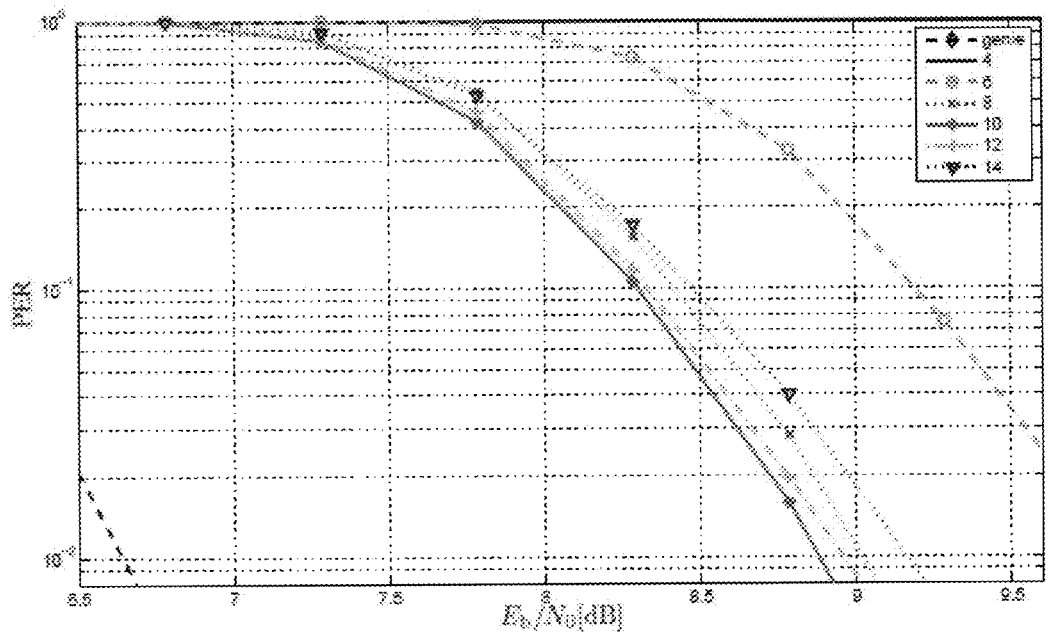
Figure 21:
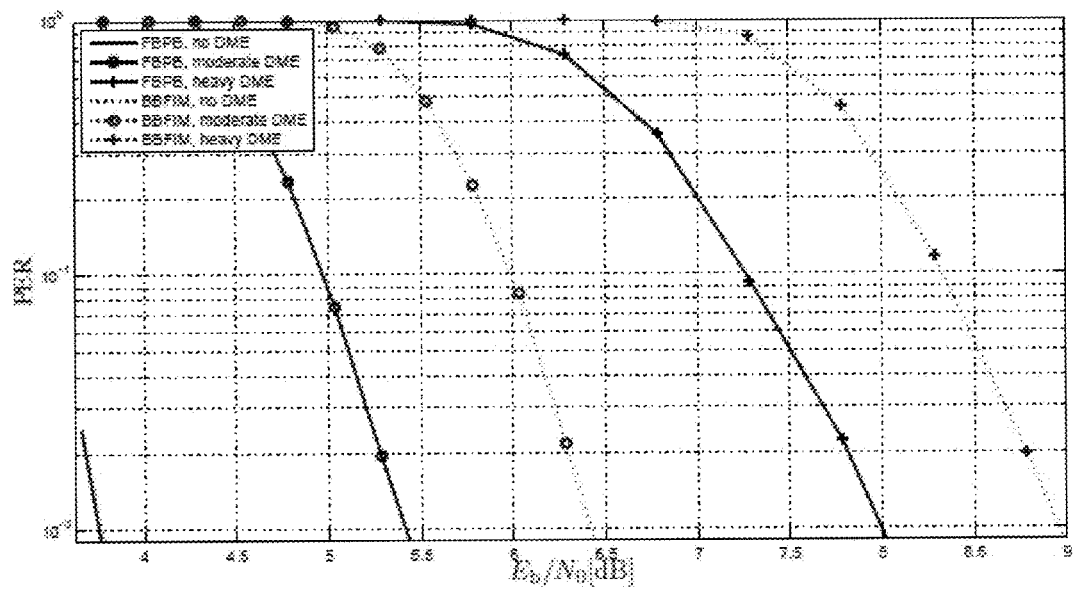

Further advantages and details can be found in the following description of a preferred embodiment of the invention with reference to the drawing. In the drawings:

FIG. 1 shows the block diagram of a receiver according to the invention for frequency- and time-selective interference suppression, FIG. 2 shows a block diagram of an L-DACS1 transmitter according to the state of the art, FIG. 3 is a graph showing the unfiltered L-DACS 1 and DME signal with a frequency offset of −500 kHz and +500 kHz according to the prior art, FIG. 4 is a graph with unfiltered L-DACS 1 and DME signal at the L-DACS 1 receiver in the time domain according to the prior art, FIG. 5 is a block diagram for a receiver with pulse-blanking and combination unit according to the DFT according to the prior art, FIG. 6 is a block diagram for a receiver, in which the order of DME suppression and OFDM windowing is changed, FIG. 7 is a flow diagram for a block-based-frequency-interference-mitigation method BBFIM according to the invention, FIG. 8 is a graph for a non-windowed, a rectangle-windowed, and a Hann-windowed DME signal in the time domain, FIG. 9 shows a graph for the power density spectrum of the DME signals of FIG. 8, FIG. 10 is a graph for packet error rate (PER) and for varying number of samples at an $E_b/N_0$-value of 6.0 dB, FIG. 11 is a graph for the packet error rate (PER) and for varying $E_b/N_0$-values at worst-case, FIG. 12 is a flow chart for a filter bank pulse-blanking method FBPB before the OFDM-windowing according to the invention, FIG. 13 is a graph for the bit error rate (BER) before decoding and for varying number of TACAN/DME stations at different number of sub-bands, FIG. 14 is a graph for the bit error rate (BER) before decoding and for varying number of TACAN/DME stations at different block sizes, FIG. 15 shows a graph for the bit error rate (BER) before decoding and for varying the number of TACAN/DME stations at different threshold values θ, FIG. 16 is a graph for the packet error rate (PER) and for various $E_b/N_0$-values at different thresholds θ and without DME interference, FIG. 17 is a graph for the packet error rate (PER) and for various $E_b/N_0$-values at different thresholds θ and moderate DME interference, FIG. 18 is a graph for the packet error rate (PER) and for various $E_b/N_0$-values at different thresholds θ and strong DME interference, FIG. 19 is a graph for the bit error rate (BER) before decoding and for varying the number of TACAN/DME stations at different threshold values θ, FIG. 20 is a graph for packet error rate (PER) and for varying number of TACAN/DME stations at different thresholds θ and strong DME interference, and FIG. 21 is a graph for the packet error rate (PER) and for various $E_b/N_0$-values at the threshold value θ=10 for FBPB and θ=12 for BBFIM and for different DME interference according to the invention.

DETAILED DESCRIPTION OF THE INVENTION

The receiver structure of a frequency and time-selective interference suppression according to the invention for a communication system based on OFDM using a filter bank is shown in FIG. 1. Inventive constituents of the receiver E are a blanking unit BU for a frequency-selective pulse-blanking with the aid of a filter bank, a detection unit DU for the frequency-selective detection of the interference, a blanking mitigation unit BMU for adaptation to interfered disturbances introduced by pulse-blanking and an ICI cancellation unit ICU for eliminating the interference introduced by pulse blanking.

In Q. Zhang, Y. Zheng, S. Wilson, "Excision of Distance Measuring Equipment Interferences from Radio Astronomy Signals", The astronomic journal, pp. 2933-2939, 2005, the suppression of DME-signals in broadband astronomy signals is examined with the aid of a filter bank. This idea is now transferred to an OFDM-system. The blanking unit BU according to the invention consists of the analysis filter bank AFB with M sub-bands, the module for the frequency-selective pulse-blanking of the sub-band signals PBS (comparable to a switch per spectral range, which extends or suppresses the signal, in particular outputting the spectral components Signal for DME-detection via line BS and outputting the control information of the pulse blanking, i.e. quasi the switch positions per spectral range over the time or per block via line BC) and a synthesis-filter-bank SFB, which reproduces the signal (via BS). The analysis filter bank AFB, which divides frequency-selectively the receive signal SRS into several sub-bands, is used before the OFDM-windowing. The polyphase structure according to the invention can be used during the implementation. Pulse-blanking can be applied sub-band-selectively by the sub-band decomposition. That is, sub-bands that are severely affected by interference can be more suppressed than sub-bands that are less affected. After being subdivided into different sub-bands with the analysis filter bank AFB, the blanking process can be applied separately in each sub-band. As a result, the useful signal is less strongly attacked than with pure pulse-blanking. The number of sub-bands is M. In Q. Zhang, Y. Zheng, S. Wilson, "Excision of Distance Measuring Equipment Interferences from Radio Astronomy Signals", reference as above, a filter bank is generally proposed (i.e., not OFDM-specific) for suppressing narrow-band interference in a broadband system.

The detection of the disturbance in the detection unit DU (in particular in the module DME detection DD) is simplified by the sub-band decomposition because sub-bands are present which are strongly affected by the disturbance. Detection of existing DME impulses occurs over time or per block and for each spectral component, whereby the information about other spectral components can be used to decide whether a disturbance is present in a spectral range. Thus, interference-detection can be applied to improve the decision to suppress the pulse. If this is not known, pulse-blanking with power detection, see S. Brandes, S. Gligorevic, M. Ehammer, T. Gräupl, R. Dittrich, "Expected B-AMC System Performance", reference as above, can also be used here, but only sub-band-selective.

The introduced ICI is greatly reduced by the sub-band selective suppression. The remaining disturbance is estimated using the blanking mitigation unit BMU. This information is now used three times as follows:

1. For channel estimation in module CE, pilot values SP are used. If it is known how strongly which pilot is affected by ICI, this can be taken into account in the channel estimation.
2. The ICI estimate in the IE module is also used to calculate the reliability information for channel decoding in the CD module. In this case, symbols where a high ICI disturbance has been estimated are classified as unreliable.
3. In the module blanking equalization BE the signal energy loss is counteracted by pulse-blanking. This equalization works optimally.

The iterative estimation and extinction of introduced ICI in OFDM is often described in the literature. For example, in S. Brandes, U. Epple, M. Schnell, "Compensation of the Impact of Interference Mitigation by Pulse Blanking on OFDM Systems", reference as above, an implementation thereof in the case of pulse-blanking and OFDM is described. According to the invention, the method is extended in the ICI cancellation unit ICU, since ICI is now sub-band-selective and needs to be estimated differently.

In the filter bank pulse-blanking method FBPB according to the invention, the order of DME suppression and OFDM-windowing are exchanged, see FIG. 6 as well as in detail below. Because of the frequency-selective character of DME, the suppression in the frequency range should take place whereas the impulsive characteristic should not be ignored.

An analysis of the thresholds for power detection according to the invention is described in detail below. Before the OFDM-demodulation, the processed sub-bands are reassembled in the synthesis step. There is a target conflict between the resolution in time and frequency range. The number of sub-bands and the filter type determine this target conflict. A low-pass filter on the receiver can be omitted since the DME-signals are suppressed by frequency selection. The implementation according to the invention with the aid of a polyphase structure is described in detail below.

In each sub-band in, the sampled receive signal $r[n]$ is filtered with a finite impulse response (FIR) $h_m[n]$ of length K, where in $=\{0, \ldots, M-1\}$. The sub-band filters are generated by modulating a low-pass filter $h_0[n]$:

$$h_m[n] = h_0[n] \cdot w_M^{-mn} \qquad (6)$$

where $w_M = e^{-2\pi/M}$. To reduce the complexity, according to the invention, the synthesis filter bank can be brought into a polyphase structure:

$$r_m[n] = r[n] * h_m[n] = \sum_{k=-K/2}^{K/2-1} r[n-k] \cdot h_0[k] \cdot \omega_M^{-mk} \qquad (7)$$

$$= \sum_{\kappa=0}^{M-1} \omega_M^{-m\kappa} \sum_{\lambda=-K/2M}^{K/2M-1} r[n - \lambda M - \kappa] \cdot h_0[\lambda M + \kappa], \qquad (8)$$

wherein the second sum in (6) corresponds to the windowed and periodically expanded input signal. The window corresponds to the impulse response of the prototype filter. For each output value n, a Fast Fourier Transform FFT of length M is applied. The block diagram of this implementation is shown in FIG. 12.

A comparison with respect to complexity and performance with other pulse-blanking methods with the assumption of a perfect DME detection is made below. Firstly, however, power detection for DME detection is shown and analyzed for different threshold values.

After subdivision into different sub-bands, the blanking process can be applied in each sub-band. Pulse-blanking with power detection is a very simple procedure. The signal $r_m[n]$ in the sub-band in (m∈$\{0, 1, \ldots, M-1\}$) is set to zero at position n if the instantaneous power of the receiving signal in the m-th subband $|r_m[n]|^2$ exceeds the threshold value $\theta \cdot \overline{P}_m[n]$:

$$r_m^{IM}[n] = \begin{cases} r_m[n], & \text{if } |r_m[n]|^2 < \theta \cdot \overline{P}_m \\ 0, & \text{else} \end{cases} \qquad (9)$$

$\overline{P}_m$ is the average received power of the L-DACS1 signal in the sub-band in, and $\theta$ is the power-detection parameter. Before the OFDM-demodulation, the sub-bands are summed up in the synthesis filter bank.

The adjusted threshold value $\theta$ is a design parameter. An intuitive choice is $\theta=1$, which is a good compromise between interference suppression and ICI formation. Instead of making the decision to blank the sub-band signals hard if a certain threshold value is reached, a soft decision can also be made if the average power of the useful signal $P_m$, the disturbance variance $N_m^{awgn}$ and the instantaneous power of the pulse interference $P_m^{pulse}[n]$ is available on all sub-bands:

$$r_m^{MMSE}[n] = r_m[n] c_m[n] \qquad (10)$$

with $$c_m[n] = \frac{P_m^{useful}}{P_m^{useful} + N_m^{awgn} + P_m^{pulse}[n]} \qquad (11)$$

The adaptation of the OFDM receiver components to the influence by pulse suppression is taken into account by the SINR after filter bank pulse suppression (in the SINR estimation module SE of the blanking unit BU, which estimates the signal quality for the OFDM subcarriers according to the residual distortions and the DME disturbances still present, in order to take them into further "normal" processing; i.e. carriers with residual interference are e.g. weighted less in the channel decoding, this is realized by appropriate scaling during LLR calculation), the equalization pulse suppression, the adaptation of the channel estimation (estimation in the channel module CE), the adaptation of the LLR calculation (in the LLR-calculation module LLR) and the ICI extinction (in the ICI cancellation unit ICI), as described below.

The SINR on the subcarriers k of an OFDM-symbol can be written as $$SINR(k) = \frac{E^{used'}(k)}{E^{awgn'}(k) + E^{ICI'}(k) + E^{pulse'}(k)} \quad (12)$$

where $E^{used'}(k)$, $E^{awgn'}(k)$, $E^{ICI'}(k)$ and $E^{pulse'}(k)$ represent the energies of the useful signal, noise, ICI and pulse interference after the pulse blanking on the subcarrier k. The following formulas are derived below.

The frequency response from the subcarrier k in the subband in is $H_m^{FBPB}(k)$. The residual energy of the useful signal is then $$E^{used'}(k) = \sum_{m=0}^{M-1} H_m^{FBPB}(k) \left(\frac{1}{N}\sum_n c_m[n]\right)^2 E^{useful} \quad (13)$$

The summing according to equation (13) takes place in practice for the run index n from 0 to K−1. The expectation of the noise power is $$E\{E^{awgn'}(\kappa)\} = E^{awgn} \sum_{k=0}^{K-1} \left|\sum_{m=0}^{M-1} H_m^{FBPB}(k)C_m(\kappa - k)\right|^2 \quad (14)$$

where Cm(k) is the DFT transformation of the blanking window/Fade-out window cm[n].

The expected value of ICI energy is $$E\{E^{ICI}(\kappa)\} = \sum_{\substack{k=0 \\ k \neq \kappa}}^{K-1} E^{LDACS}(k) \left|\sum_{m=0}^{M-1} H_m^{FBPB}(k)C_m(\kappa - k)\right|^2 \quad (15)$$

In U. Epple, D. Shutin, M. Schnell, "Mitigation of Impulsive Frequency-Selective Interference in OFDM Based Systems", IEEE Wireless Communications Letters, reference as above, an approximation of the ICI energy is described, which is only valid if the fading coefficients are independent but equally probable. However, this is not the case if pulse interference lasts longer than one sample value.

The energy of the soft-suppressed impulse noise cannot be calculated directly because it passes through channel deformation, reception filtering, filter-bank filtering, and sub-band selective soft pulse blanking. If a pulse occurs, however, it is suppressed and therefore the ICI is crucial for that actual SINR.

The pulse suppression leads to energy reduction on the data carriers and to ICI (see U. Epple, K. Shibli, M. Schnell, "Investigation of Blanking Nonlinearity in OFDM Systems", reference as above). The energy reduction can be calculated by $$C(0) = \frac{1}{\sqrt{\sqrt{N}}} \sum_{n=0}^{N-1} c[n]$$

for SPB and CPB, as well as calculated by $$R^{ICI'}(k) = \sum_{\substack{\kappa=0 \\ \kappa \neq k}}^{K-1} S(\kappa)H(\kappa)C(k - \kappa)$$

for FBPB. After this, the values after the DFT (which converts the control information for the pulse suppression into the frequency range, from which the distortions introduced by the pulse suppression into the useful signal can then be derived) can be equalized with the help of the Pulse suppression equalization unit BE in the blanking mitigation unit BMU, i.e. these distortions in the useful signal are partially compensated before this is fed to the "normal" OFDM demodulation.

$$R''(k) = \frac{R'(k)}{V_{LDACS}(k)} \quad (16)$$

The argument k of $V_{LDACS}(k)$ can be used for Simple Pulse Blanking SPB and Combination Pulse Blanking CPB are omitted because all subcarriers are equally affected. Of course, the ICI energy also increases through this process. This must be considered.

If pilot-based channel estimation is used, the knowledge of the SINR value on each pilot is advantageous to improve the accuracy of the channel estimation. For this purpose, the SINR value of each pilot is calculated by equation (12) and passed to the channel estimation unit CE. Then MMSE-based channel estimation can be adapted to the SINR values (see U. Epple, K. Shibli, M. Schnell, "Investigation of Blanking Nonlinearity in OFDM Systems", reference as above).

If we have an estimate of the sending symbols S (k), the ICI can be calculated by $$C(0) = \frac{1}{\sqrt{\sqrt{N}}} \sum_{n=0}^{N-1} c[n]$$

using the estimated channel frequency response $\hat{H}(k)$ and the DFT of the cancellation coefficients C(k).

If a filter bank is used, the ICI can be calculated by equation (15) with the frequency response of the sub-band filter $H_m^{FBPB}(k)$. The DFT values of the extinction coefficients $C_m(k)$ are then frequency-selective.

The derivation of the above equations is as follows:

For the analysis of the blanking effects, the sampled receive signal of an OFDM symbol after pulse blanking can be written as:

$$r'[n] = c[n]r[n] \quad (17)$$
$$= c[n](s[n] * h[n] + n^{awgn}[n] + i^{pulse}[n])$$

The DFT is $$R'(k) = C(k) * R(k) \quad (18)$$
$$= C(k) * (S(k)H(k) + N^{awgn}(k) + I^{pulse}(k))$$

Equation (17) can be divided: the deformed useful signal, the deformed AWGN noise signal and the partially suppressed impulse noise. The deformed useful signal consists of the energy-reduced signal on all subcarriers and the inputted ICI.

The calculation of the energy reduction factor of the useful signal and the calculation of the exact ICI values after the pulse suppression, as well as the estimation thereof, are described below. In particular, the estimation of the reduced noise variance is described, assuming that the residual interference of the impulse interference after the suppression is negligible.

$$R^{useful+ICI'}(k) = (S(k)H(k)) * C(k) \quad (19)$$

$$R^{useful+ICI'}(k) = \sum_{\kappa=0}^{K-1} (S(\kappa)H(\kappa)C(k-\kappa)) \quad (20)$$

where $C(-k) = C(k)^*$. This means that the windowing corresponds to a convolution of the spectrum without pulse suppression $S(k) H(k)$ with the DFT transformation $C(k)$ of the window coefficients of the pulse suppression $c[n]$. This sum can be divided into two parts. The first part contains the energy reduction of the useful signal on each subcarrier:

$$R^{useful'}(k) = S(k)H(k)C(0). \quad (21)$$

with $$C(0) = \frac{1}{\sqrt{\sqrt{N}}} \sum_{n=0}^{N-1} c[n] \quad (22)$$

The energy reduction factor on the subcarrier k is $$V(k) = C(0)^2 = \left(\frac{1}{\sqrt{N}} \sum_{n=0}^{N-1} c[n]\right)^2 \quad (23)$$

The second part consists of the ICI values $$R^{ICI'}(k) = \sum_{\substack{\kappa=0 \\ \kappa \neq k}}^{K-1} S(\kappa)H(\kappa)C(k-\kappa) \quad (24)$$

The exact ICI value can now be calculated if an estimation of the transmission values S(k) is present, see ICI cancellation unit. The ICI energy on the subcarrier k can be calculated via $$E^{ICI}(k) = \left|\sum_{\substack{\kappa=0 \\ \kappa \neq k}}^{K-1} \underbrace{S(\kappa)C(k-\kappa)}_{zero-mean, i.i.d.}\right|^2 \quad (25)$$

The values for S(k) and C(k) are mean-value free and the values of S(k) are distributed independently of one another but identical, therefore the expected value $$E\{E^{ICI}(k)\} = \sum_{\substack{\kappa=0 \\ \kappa \neq k}}^{K-1} E^{useful}(\kappa)|C(k-\kappa)|^2 \quad (26)$$

with $E^{useful}(k) = E\{|S(k)e^{j\Phi_k}|\}$.

If a filter-bank pulse suppression method is used, the energy reduction is subcarrier-selective. Since the frequency response of the sub-band filter $H_m^{FBPB}(k)$ and the sub-band-selective cancellation coefficients $c_n[n]$ are known, equation (26), (equation 22) and (equation 24) can be adapted:

$$R^{ICI'}(k) = \sum_{\substack{\kappa=0 \\ \kappa \neq k}}^{K-1} S(\kappa)H(\kappa)C(k-\kappa) \quad (27)$$

$$V(k) = \sum_{m=0}^{M-1} H_m^{FBPB}(k)\left(\frac{1}{\sqrt{N}}\sum_{n=0}^{N-1} c_m[n]\right)^2 \text{ and} \quad (28)$$

$$E^{ICI}(\kappa) = \left|\sum_{\substack{\kappa=0 \\ \kappa \neq k}}^{K-1}\sum_{m=0}^{M-1} \underbrace{S(\kappa)H_m^{FBPB}(k)C_m(\kappa-k)}_{zero-mean, i.i.d.w.r.t.k}\right|^2 \quad (29)$$

The expected value is $$E\{E^{ICI}(\kappa)\} = \sum_{\substack{\kappa=0 \\ \kappa \neq k}}^{K-1} E^{useful}(k)\left|\sum_{m=0}^{M-1} H_m^{FBPB}(k)C_m(\kappa-k)\right|^2 \quad (30)$$

For the estimation of the noise variance after the pulse suppression, the energy of the noise component after pulse suppression and DFT is equivalent $$E^{awgn'}(\kappa) = \left|\sum_{k=0}^{K-1}\underbrace{N(k)C(\kappa-k)}_{zero-mean, i.i.d.}\right| \quad (31)$$

The expected value is $$E\{E^{awgn'}\} = E^{awgn}\sum_{k=0}^{K-1}|C(\kappa-k)|^2 \quad (32)$$

$$E\{E^{awgn'}\} = E^{awgn}\sum_{k=0}^{K-1}|c(k)|^2 \quad (33)$$

If a filter bank is used, the calculation of the filter bank will change

Expected value for:

$$E\{E^{awgn'}(\kappa)\} = E^{awgn} \sum_{k=0}^{K-1} \left| \sum_{m=0}^{M-1} H_m^{FBPB}(k) C_m(\kappa - k) \right|^2 \quad (34)$$

The filter bank pulse-blanking method FBPB according to the invention comprises the following points:
- Combination of a filter bank with pulse-blanking in the blanking unit BU for suppressing frequency-selective impulse interference in OFDM,
- Algorithm for estimating DME in the sub-bands by exploiting the spectral shape,
- Adjustment of OFDM-demodulation and channel decoding to intercepted interference by pulse-blanking,
- For further improvement of the reception quality, implementation of an ICI cancellation by an iterative feedback, which reconstructs the assumed send signal SRS from the last decoding result (via a Connecting line from the module for channel decoding CD, module for channel estimation CE and module for channel multiplication ICM), estimates the actual disturbances in the useful signal (ICI cancellation unit (ICU)) and uses this estimate to subtract the disturbances (adder A) and/or uses in the frame of the SINR estimate (connection line UD to SINR estimation SE).

Through the receiver structure according to the invention, the bit error and packet error rate is lowered or with the same bit error/packet error rate a lower transmission power can be used or with the same transmission power, stronger disturbances or a smaller signal-to-noise ratio (in the case of the prior art, at least 45 nm (nautical mile)) can be permitted.

The filter bank pulse-blanking method FBPB according to the invention suffers from a high complexity because the filter operations must be applied M times. Even with an efficient polyphase structure, the complexity remains high.

In order to reduce the complexity of the interference suppression, a block-based method can be used for the frequency-selective division instead of the filter bank pulse blanking method FBPB, which transforms overlapping, Hann-windowed time blocks into the frequency range with the aid of a fast Fourier transformation FFT affected by frequency components. An adaptation of the OFDM components is not possible, since the integrated ICI cannot be calculated analytically so easily.

In order to avoid the spectral deformation of the impulse disturbance, the following describes a novel method according to the invention using a Hann-windowing and the interference suppression in the frequency range with the aid of a complexity-reduced block structure. This is hereinafter referred to as block-based frequency interference mitigation Method BBFIM. According to the invention, an FFT of length M is applied to the blocks of length M in the time domain, the DME interference is then suppressed in the frequency domain, and finally the time signal is recovered by an inverse Fast Fourier Transform (IFFT). The determination of M represents a target conflict between frequency selectivity and time selectivity.

Instead of the inflexible OFDM-window having a length of an OFDM-symbol as a block, the length of the window is reduced according to the invention and the DME suppression is advanced as shown in FIG. 7. The suppression process is applied in the frequency domain. In K. Kammeyer, K. Kroschel, "Digital Signal Processing", Vieweg+ Teubner Verlag, 7. Edition, 2009, a similar structure is used for the application of efficient filtering with a weighted overlap-add method. Instead of the FFT of a finite impulse response, BBFIM combines a spectral analysis with the interference suppression. This can be understood as time-variant filtering in the frequency domain.

Firstly, the filtered and sampled receive signal is split into overlapping blocks with index b and length M, the number of overlapping samples being at M/2:

$$r_b[n'] = r[n' + b \cdot M/2] \quad (35)$$

with $b \varepsilon \{0, 1, 2, \ldots\}$ and $n' \varepsilon \{0, 1, 2, \ldots, M-1\}$.

The blocks are then windowed with a Hann-window:

$$r_b^w[n'] = r_b[n'] \cdot w_{Hann}[n'] \quad (36)$$

with $$\omega_{Hann}[n'] = \begin{cases} \frac{1}{2}\left(1 - \cos\left(\frac{2\pi}{M} n'\right)\right) & \text{if } 0 \le n' < M \\ 0 & \text{else} \end{cases} \quad (37)$$

If the degree of overlap is set to 50%, a Hann-window satisfies the characteristic that the sum of the windowed parts is the original signal. If other overlapping degrees are selected, a modified window can be used.

In this windowing according to the invention, the spectral form of the DME pulses is only slightly changed. FIG. 8 shows a non-windowed, a rectangular-windowed, and a Hann-windowed version of a DME signal. The DME double pulse is cut off by the rectangle-window. On the other hand, the Hann-window does not destroy the Gaussian form of the DME impulse.

FIG. 9 shows the power density spectrum of these signals. It is also apparent that all frequencies are disturbed by DME when a rectangle-window is used. The Hann-windowed signal, however, does not suffer from the cut-off of the DME pulse. Therefore, the frequency-selective interference suppression is improved by the use of a Hann-window. After the windowing, each block is transformed by means of FFT of length M into the frequency domain.

$$R_b[k] = \text{FFT}_M\{r_b^w[n']\} \quad (38)$$

Now the pulse-like frequency-selective is suppressed by zeroing the FFT output values at the points where the DME interference (interference) has been detected. A simple implementation is again the power detection, where the values are set to zero whose energies at the output of the FFT exceed a certain value:

$$R_b^{IM}[k] = \begin{cases} R_b[k], & \text{if } R_b[k] < \Theta \cdot \overline{P}[k] \\ 0, & \text{else} \end{cases} \quad (39)$$

The threshold value θ is again the determining parameter and $\overline{P}[k]$ represents the expected value of the L-DACS1 signal energy at the frequency position k. An investigation of a choice for θ is described below. Thereafter, an IFFT is applied to retrieve the time signal for each block:

$$r_b^{IM}[n'] = \text{IFFT}_M\{R_b^{IM}[k]\} \quad (40)$$

Since the blocks overlap, the values in the time domain must also be summed overlapping:

$$r[n]^{IM} = \sum_{b=-\infty}^{\infty} r_b^{IM}[n - b \cdot M/2] \qquad (41)$$

In practice, by the 50% overlap of the blocks (see FIG. 7) the predecessor block and the successor block are considered in the sum formation according to equation (41), (see also equation (35)). The combination of Hann-windowing and FFT-block processing, is the key of the solution according to the invention to realize interference suppression at L-DACS1 with a limited complexity. A low-pass filter can also be omitted since the DME interference is frequency-selective suppressed. The target conflict between the resolution in time and time frequency range is achieved by selecting a suitable window size M.

To investigate computational complexity, the number of complex multiplications (CM) per OFDM symbol is examined. The signals are received in a frequency band of 2.5 MHz, where L-DACS1 is in the center of the spectrum, see FIG. 8. An FFT of length 256 is used for OFDM demodulation. Since the guard interval contains 44 additional values, 300 values must be processed per OFDM symbol. $M/2 \cdot \log_2(M/2)$ CM are necessary to calculate an FFT of length M, see K. Kammeyer, K. Kroschel, "Digital Signal Processing", reference as above, ICI suppression is not considered here.

In Tab. I, the computational complexities of the four methods are shown in terms of the number of CM per OFDM symbol sorted in ascending order.

TABLE I

| Computing Complexities | | |
|---|---|---|
| approach | #CM | additional complexity |
| BBFIM | 3600 | |
| SPB | 19200 | |
| CPB | 20096 | combination unit |
| FBPB | 38400 | |

A low-pass filter must be inserted before Simple Pulse-Blanking SPB and Combination Pulse-Blanking CPB. If one proceeds from a filter order of size 64, 300×64=19.200 CM per OFDM symbol are necessary. The complexity of the filter is, of course, scalable. An additional FFT of length 256 for the CPB requires 256/2·log 2 {256/2}=896 CM.

Subsequently, it is shown that, with respect to interference suppression, 32 subbands achieve the best result. For the selection of the number of sub-bands (FBPB) or Block size (BBFIM), an analysis is made. The bit error rate (BER) before the channel decoding is made for various DME levels with respect to effective TACAN/DME stations, whereby an effective TACAN/DME station stands for a duty cycle of 3.600 pulse pairs per second (ppps). Interferences of TACAN stations are considered in the simulations since this is the worst case. The DME double pulses are randomly distributed over time and are distributed equally to the carrier frequencies ±500 kHz. The peak power of the DME pulses is −60 dBm. The highest possible TACAN pulse amplitude is used.

An $E_b/N_0$ value of 10 dB is assumed below. Assuming the link budget of L-DACS1, see also M. Sajatovic, B. Haindl, U. Epple, T. Gräupl, "Updated LDACS1 System Specification", reference as above, this is equivalent to an average receive level of −99.0 dBm in the en-route flight mode, i.e. in the air.

There is perfect interference detection, i.e. the signal is then set to zero when the instantaneous power of DME exceeds that of L-DACS 1. This is genius knowledge and the recipient is not known in practice, but should be sufficient for this analysis.

In FIG. 13, the performance at various values for the number of sub-bands for FBPB is shown. The worst score is 8 sub-bands. If the number of sub-bands is increased to 32, the BER decreases. A power loss is observed with more than 32 sub-bands. If the number of sub-bands is increased, the bandwidth of the sub-band filters decreases, but the pulse response in the time domain is lengthened and the DME signal is becoming increasingly smeared. In the following, 32 sub-bands are used since this provides the best results for all DME levels.

In FIG. 14 shows the performance for different block sizes at BBFIM. The best result is a block size of 64. If the block size is decreased the frequency selectivity is increased, on the other hand if the block size is increased the time selectivity increases. The following a block size of 64 is selected.

As a prototype filter, a raised cosine filter with order 64, as well as 32 sub-bands, is used with FBPB. This results in 300×64=19.200 CM for windowing each sample and 300× 32/2×log₂ {32/2}=19.200 CM for the FFT. With these values, the complexity of FBPB (38.400 CM) is about twice as high as for SPB. This parameter set is also used for the performance analysis described below.

The block size at BBFIM is set to 64, since this achieves the best results. The windowing needs 2−300=600 CM. An FFT and an IFFT of length 64 suggests to book with 64/2×log₂ {64/2}=160 CM. In an OFDM symbol, an average (2×300)/64=9.375 blocks are inserted. That is, in sum, BBFIM requires 600+2×1.500=3.600 CM.

BBFIM has the least complexity, followed by SPB, whose complexity is about 5 times higher. The complexity of FBPB is about twice higher than SPB. CPB needs the additional combination unit; therefore, it suffers from additional complexity.

The suppression performance of all the methods set forth above is very dependent on the detection of the interference. Detection is easier for the proposed approaches because they are applied on the sub-bands (FBPB) or FFT output values (BBFIM), where are mainly DME power. This is not the case with SPB and CPB, so it can be assumed that in practical systems the performance of Simple Pulse-Blanking SPB and CPB falls even further compared to FBPB and BBFIM.

In the simulations the threshold decisions see, for example, S. Brandes, S. Gligorevic, M. Ehammer, T. Gräupl, R. Dittrich, "Expected B-AMC System Performance", reference as above, are replaced by the following genius-based deciding rule: Each receive value is blanked if the instantaneous power of DME on this sample is higher than the average power of L-DACS on that sample.

To apply the combining step at CPB, an estimate of the SINR values on the subcarriers in both paths is made beforehand. A combination can then be realized via maximum-ratio-combining. The simulations use genius knowledge. In practical systems, an estimation error of the SINR values results in a loss of performance.

The overall performance of the system depends only on the number of lost packets. Therefore, the packet error rate (PER) after the decoding is regarded, see M. Sajatovic, B. Haindl, U. Epple, T. Gräupl, "Updated LDACS1 System Specification", reference as above, whereby 728 information bits form a packet. These bits are encoded with a code rate of 0.45 and are modulated with QPSK. This is the most robust modulation and coding scheme of L-DACS1. An L-DACS 1 data frame consists of 54 OFDM symbols and carries 3 packets. The target packet error rate of L-DACS1 is 0.01. This merit number is a better choice compared to the bit error rate since the performance of the overall system depends only on the number of lost packets.

Above all the frequency diagrams of DME and L-DACS1 stations determine the influence of interferences. Instead of adopting a frequency plan, a model is used which varies only with respect to the number of DME stations, carrier frequencies, and reception powers. An overlay of many DME stations is assumed in each simulation. The simulation parameters for DME stations are shown in Tables II and III for moderate and strong DME interference.

TABLE II moderate DME interference

| Δ center freq. | duty cycle | distance | peak received power |
|---|---|---|---|
| −500 kHz | 2 · 3600 ppps | 26 km | −60 dBm |
| −500 kHz | 2 · 3600 ppps | 270 km | −70 dBm |
| +500 kHz | 2 · 3600 ppps | 26 km | −60 dBm |
| +500 kHz | 2 · 3600 ppps | 270 km | −70 dBm |

The DME simulation parameters are carrier frequency relative to the L-DACS1 carrier frequency, the duty-cycle of the DME-double pulses in ppps, and the peak power of the receive level of DME in dBm.

An $E_b/N_0$ value of 4.6 dB applies. If the link budget of L-DACS1 is used, see M. Sajatovic, B. Haindl, U. Epple, T. Gräupl, "Updated LDACS1 System Specification", reference as above, then this is equivalent to a reception level of −104.4 dBm in flight mode en-route.

In FIG. 15 the BER is shown before the channel decoding for FBPB (M=32) for different values of the Power Detection Parameter θ for different number of effective DME stations. If a DME fault is not active, a θ≥10 is advantageous if the number of DME stations is 10, then the best value is 8, followed by 10. Therefore, a value of θ=10 is a good value.

The worst interference is expected on L-DACS aircraft, so only FL is simulated. Furthermore, interference from TACAN stations with the highest possible pulse amplitude and duty cycle is assumed because this is the worst case. If we take the link budget of L-DACS as the basis, see M. Sajatovic, B. Haindl, U. Epple, T. Gräupl, "Updated LDACS1 System Specification", reference as above, thus, an $E_b/N_0$ value of 6.0 dB corresponds to an average reception level of −103.0 dBm in the en-route flight mode.

In FIG. 16, the packet error rate is shown for a scenario without DME interference and for various $E_b/N_0$ values. A threshold value θ≥10 is necessary in order to limit the influence of interference suppression, if no interference is present. It is noteworthy that the PER curve of θ≥12 falls below the curve of gen-sampled DME detection. This is because noisy interference-free sample values are set to zero, which is advantageous.

In FIG. 17, a scenario with a moderate DME disturbance is shown. The best result is to achieve thresholds of 8, 10 and 12.

In cases of severe DME disturbance, cf. FIG. 18, a threshold of 6 is the best, followed by a value of 8.

Table IV gives an overview of the loss of various thresholds if you are looking for a PER of 1%. If the focus is on reception in scenarios with little DME interference, a threshold of 10 should be selected. In the case of a severe fault, the parameter to be selected drops to 8.

TABLE IV

Loss in dB at different thresholds compared to the best threshold PER = 1%

| ↓ scenario, → θ | 4 | 6 | 8 | 10 | 12 | 14 |
|---|---|---|---|---|---|---|
| no DME | fail | 0.5 | 0.12 | 0.04 | 0 | 0 |
| moderate DME | fail | 0.45 | 0 | 0 | 0 | 0.1 |
| heavy DME | 1.4 | 0 | 0.15 | 0.5 | 0.7 | 1.0 |

In FIG. 19 the BER is shown before the decoding of BBFIM (M=64) for different threshold values θ with varying effective number of DME stations. If no DME is active, a θ≥12 is advantageous. An effective number of 10 DME stations achieve the best result at values 10 and 12.

FIG. 20 shows the PER for strong DME interference Again, the best threshold is 10, followed by 12.2. Table V gives an overview of the loss when using different thresholds and a PER of 1%.

TABLE V

Loss in dB at different thresholds compared to the best threshold PER = 1%

| ↓ scenario, → θ | 4 | 6 | 8 | 10 | 12 | 14 |
|---|---|---|---|---|---|---|
| no DME | fail | fail | 0.5 | 0.18 | 0.05 | 0 |
| moderate DME | fail | 1.0 | 0.3 | 0.1 | 0 | 0 |
| heavy DME | fail | 0.9 | 0.15 | 0 | 0.15 | 0.3 |

A fixed threshold of 12 is a good compromise since the performance is the best in moderate DME disturbance and it is close to the optimum threshold at high DME disorder.

In FIG. 21, an overview of the PER curves for the three DME scenarios is given once again when the values θ=10 and θ=12 are used.

FIG. 10 shows the PER for varying number of ppps. The peak power of the DME receive signal is −60 dBm. The frequency offset of the DME channels are equally distributed at ±0.5 MHz. The position to of the DME pulses is random. Assuming a target error rate of 0.01, FBPB does not fail under a duty cycle of 10.000 ppps, followed by BBFIM with 6.000 ppps. CPB and SPB already fail at a duty cycle of 2.500 ppps and 1.500 ppps.

A worst-case DME scenario is assumed in order to demonstrate the robustness of the procedures, see the following table III.

TABLE III

Strong DME interference

| Δ center freq. | duty cycle | distance | peak received power |
|---|---|---|---|
| −500 kHz | 3.600 ppps | 26 km | −50 dBm |
| −500 kHz | 2 · 3.600 ppps | 26 km | −60 dBm |
| −500 kHz | 4 · 3.600 ppps | 270 km | −70 dBm |
| +500 kHz | 3.600 ppps | 26 km | −50 dBm |
| +500 kHz | 2 · 3.600 ppps | 84 km | −60 dBm |
| +500 kHz | 4 · 3.600 ppps | 270 km | −70 dBm |

The DME simulation parameters are as follows: carrier frequencies relative to the carrier frequency of L-DACS 1, the duty-cycle of the DME-double pulses in ppps, the distance between DME ground station and LDACS receivers on the aircraft, and the peak power of the reception signals in dBm. The aviation radio channel is also valid for the DME signal. Therefore, the same en-route channel-scenario is used for DME signals, i.e. the echo paths are also received.

FIG. 11 shows the robustness for varying $E_b/N_0$ values. The loss of FBPB and BBFIM to the interference free case is for a PER of 0.01 at approximately 2 dB and 3 dB. The distance to CPB is nearly 6 dB, since CPB suffers enormously from the spectral spreading of the DME pulses. Simple Pulse-Blanking SPB fails completely because the ICI is too high.

The filter bank pulse-blanking method FBPB according to the invention with sub-band-selective pulse blanking has the best performance under all interference suppression methods considered. In particular, a filter bank with frequency-selective pulse-blanking is used in the sub-bands, whereby 32 sub-bands achieve the best result with regard to BER if an L-DACS1 receiver having a bandwidth of 2.5 MHz is used for DME interference what is equal to a sub-band distance of 78.125 kHz. In combination with pulse-blanking and power detection, a fixed power detection threshold value in the range 10-12 achieves good results for all DME pulse abundances; disadvantage is a high complexity.

The second block-based frequency-selective method according to the invention BBFIM for interference suppression offers the second best interference suppression and has the least complexity. In particular, efficient block processing is combined with a Hann-windowing. The best result is a block size of 64 if a bandwidth of 2.5 MHz is used for an L-DACS1 receiver with DME interference. It can also be combined with power detection with an optimal threshold of 12 for all DME pulse frequencies. Therefore, it is the best choice when low complexity is required.

Additional advantages and modifications will readily occur to those skilled in the art. Therefore, the invention in its broader aspects is not limited to the specific details and illustrative examples shown and described herein. Accordingly, various modifications may be made without departing from the spirit or scope of the general inventive concept as defined by the appended claims and their equivalents.

The invention claimed is:

1. A method for reducing interfering effects of pulse-shaped interference signals in an orthogonal frequency division multiplexing-based data transmission in a modulated data with multiple carrier frequencies wherein:
    a) a pulse-shaped interfering signal is detected in a modulated orthogonal frequency division multiplexing-based transmission signal received by a receiver,
    b) for suppression of the pulse-shaped interference signal in the transmission signal received by the receiver, the received transmission signal is multiplied by a window-function,
    c) the window function is differentiated in a time domain as a continuous function,
    d) the transmission signal multiplied by the window-function is decoded in the receiver after transmission channel estimation and signal equalization,
    e) for transmission channel estimation of data which is assigned to individual carrier frequencies of the multiple carrier frequencies, a reliability value is assigned which describes how credible the received or estimated data is, and
    f) the assigned reliability values for data associated with individual carrier frequencies affected by the pulse-shaped interfering signal is set to zero before the transmission signal multiplied by the window-function is decoded in the receiver,
    wherein a filter bank pulse blanking method is used, in which:
    a sampled received signal (r) is fed to a blanking unit for frequency-selective pulse-blanking, which comprises an analysis filter bank with M sub-bands, a module for frequency-selective pulse blanking of the M sub-band signals and a synthesis filter bank, which reassembles the sampled received signal, and
    the analysis filter bank divides the sampled received signal into several sub-bands in a frequency-selective manner, in front of an orthogonal frequency division multiplexing-windowing such that sub-band decomposition is used to apply pulse-blanking sub-band-selectively.

2. The method according to claim 1, wherein detection of a disturbance in a detection unit in the sub-bands takes place sub-band-selectively.

3. The method according to claim 1, wherein a blanking mitigation unit for adaptation to interfered interferences by pulse-blanking and an inter-carrier interferences cancellation unit for eliminating the introduced interference by pulse blanking is used, and whereby:
    output of the blanking mitigation unit is provided to a module for channel estimation based on pilot values,
    the output of the blanking mitigation unit is provided to a module of the inter-carrier interferences cancellation unit for classification of symbols, in which an inter-carrier interferences disturbance was estimated as unreliable, and
    the output of the blanking mitigation unit is provided to a blanking equalization module for equalizing values after the orthogonal frequency division multiplexing-windowing.

4. The method according to claim 1, wherein a block-based-frequency interference mitigation method is used, whereby a fast Fourier transformation of length M is applied to blocks of length M in the time domain, a Distance Measuring Equipment then suppresses disturbance in a frequency domain, and finally a time signal is retrieved by an inverse fast Fourier transformation using a Hann-window or another Nyquist-window with a soft edge, and interference suppression in the frequency domain is carried such that a spectral analysis is combined with the interference suppression and time-variant filtering takes place in the frequency domain.

5. The method according to claim 4, wherein a filtered and the sampled received signal is split into overlapping blocks with index b and length M, whereby a number of overlapping samples is at M/2, as set forth in formula (35):

$$r_b[n']=r[n'+b\cdot M/2] \quad (35)$$

wherein b$\varepsilon$ {0, 1, 2, . . . } and n'$\Sigma$ {0, 1, 2, . . . , M−1} and the blocks are then windowed with the Hann-window as in formulas (36) and (37):

$$r_b^w[n']=r_b[n']\cdot w_{Hann}[n'] \quad (36)$$

wherein:

$$\omega_{Hann}[n'] = \begin{cases} \frac{1}{2}\left(1-\cos\left(\frac{2\pi}{M}n'\right)\right) & \text{if } 0 \le n' < M \\ 0 & \text{else} \end{cases} \quad (37)$$

and wherein when the another Nyquist window is selected, a number of overlapping scanners is selected such that a sum of time-shifted Nyquist-windows sums up to a value of 1.

6. A system for carrying out the method according to claim 1, wherein the sampled received signal is fed to a blanking unit for frequency-selective pulse-blanking, wherein the blanking unit comprises an analysis filter bank with M sub-bands, a module for frequency-selective pulse-blanking of sub-band signals and a synthesis filter bank, which reassembles the sampled received signal, and wherein for detection of a disturbance in the sub-bands the blanking unit is connected to a detection unit and, for adapting to interfered disturbances by pulse-blanking, the blanking unit is connected to a blanking mitigation unit.

7. The system according to claim 6, wherein the blanking mitigation unit is connected to an inter-carrier interferences cancellation unit, and wherein for classification of symbols as unreliable, wherein the inter-carrier interferences cancellation unit, a module for inter-carrier interferences estimation, a module for channel multiplication and a module for channel coding are provided for estimating a high inter-carrier interferences disturbance, wherein an output signal of discrete Fourier transformation-module of the blanking mitigation unit is connected to a module of the inter-carrier interferences cancellation unit, wherein a module for signal-to-noise estimation is connected to a module for channel estimation, for channel estimation on a basis of pilot values, and to a blanking equalization module of the blanking mitigation unit, for equalization of the values after the discrete Fourier transformation.

\* \* \* \* \*

UNITED STATES PATENT AND TRADEMARK OFFICE
CERTIFICATE OF CORRECTION

PATENT NO. : 10,084,495 B2
APPLICATION NO. : 15/546231
DATED : September 25, 2018
INVENTOR(S) : Hermann Hampel et al.

It is certified that error appears in the above-identified patent and that said Letters Patent is hereby corrected as shown below:

In the Claims

In Column 24, Line 51, change: "wherein $b\varepsilon\{0, 1, 2,...\}$ and $n'\Sigma\{0, 1, 2, ..., M-1\}$ and" to --wherein $b\varepsilon\{0, 1, 2,...\}$ and $n'\varepsilon\{0, 1, 2, ..., M-1\}$ and--

Signed and Sealed this
Eleventh Day of December, 2018

Andrei Iancu
*Director of the United States Patent and Trademark Office*